(12) United States Patent
Akitomo et al.

(10) Patent No.: US 10,901,532 B2
(45) Date of Patent: Jan. 26, 2021

(54) IMAGE DISPLAY APPARATUS HAVING TOUCH DETECTION AND MENU ERASING

(71) Applicant: SHARP KABUSHIKI KAISHA, Osaka (JP)

(72) Inventors: Kenji Akitomo, Osaka (JP); Noriyuki Koyama, Osaka (JP); Katsuyasu Furukawa, Osaka (JP); Kenji Kondoh, Osaka (JP); Takaaki Ishida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/560,839

(22) Filed: Dec. 4, 2014

(65) Prior Publication Data

US 2015/0199036 A1 Jul. 16, 2015

(30) Foreign Application Priority Data

Jan. 14, 2014 (JP) ................................ 2014-004060

(51) Int. Cl.
*G06F 3/0354* (2013.01)
*G06F 3/0482* (2013.01)
*G06F 3/041* (2006.01)
*G06F 3/038* (2013.01)
*G06F 3/0484* (2013.01)
*G06F 3/0488* (2013.01)

(52) U.S. Cl.
CPC .......... *G06F 3/03545* (2013.01); *G06F 3/038* (2013.01); *G06F 3/0383* (2013.01); *G06F 3/0412* (2013.01); *G06F 3/0482* (2013.01); *G06F 3/04845* (2013.01); *G06F 3/04883* (2013.01)

(58) Field of Classification Search
CPC .. G06F 3/03545; G06F 3/0412; G06F 3/0482; G06F 3/04883; G06F 3/0383; G06F 3/04845; G06F 3/038
See application file for complete search history.

(56) References Cited

U.S. PATENT DOCUMENTS

2009/0207146 A1 8/2009 Shimasaki et al.
2012/0242603 A1* 9/2012 Engelhardt ......... G06F 3/03545
345/173

(Continued)

FOREIGN PATENT DOCUMENTS

CN 101315586 A 12/2008
JP 2-292617 12/1990

(Continued)

*Primary Examiner* — Yaron Cohen
(74) *Attorney, Agent, or Firm* — Nixon & Vanderhye PC

(57) ABSTRACT

An image display apparatus includes a display unit displaying an image, a touch detecting unit detecting a touch operation by a touch pen, a control unit executing a process allocated to the detected touch operation, and a communication unit receiving an ID transmitted from a touch pen when the touch pen is detected to be held by a user. In response to the communication unit receiving the ID, the display unit displays a partial image indicating a state of settings related to the process allocated to the touch operation by the touch pen, and in response to a touch to the partial image, the display unit displays a menu allowing a change of settings. Thus, the user can easily confirm the state of settings related to the touch operation, and can easily change the settings.

15 Claims, 20 Drawing Sheets

(56) References Cited

U.S. PATENT DOCUMENTS

| | | | |
|---|---|---|---|
| 2013/0229389 A1* | 9/2013 | DiVerdi | G06F 3/0488 345/179 |
| 2014/0082557 A1* | 3/2014 | Warner | G06F 3/0482 715/834 |
| 2015/0138122 A1* | 5/2015 | Cho | G09G 3/3406 345/173 |

FOREIGN PATENT DOCUMENTS

| JP | 5-035436 A | 2/1993 |
|---|---|---|
| JP | 6-289984 | 10/1994 |
| JP | 7-160420 A | 6/1995 |
| JP | 8-95737 | 4/1996 |
| JP | 2006-171854 A | 6/2006 |
| JP | 2009-193323 A | 8/2009 |
| JP | 2013-011994 A | 1/2013 |
| JP | 2013-109595 | 6/2013 |
| JP | 2013-242821 A | 12/2013 |

\* cited by examiner

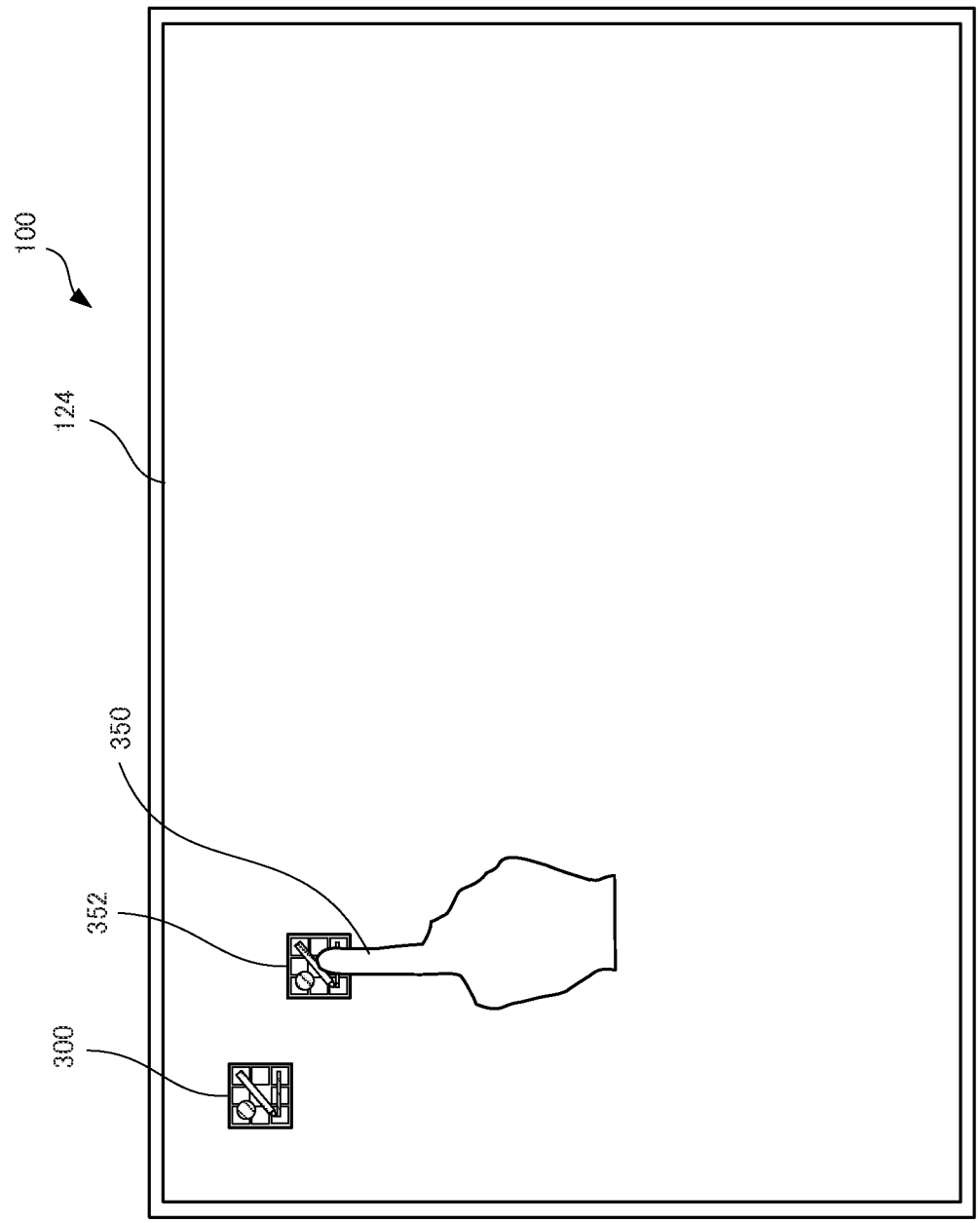

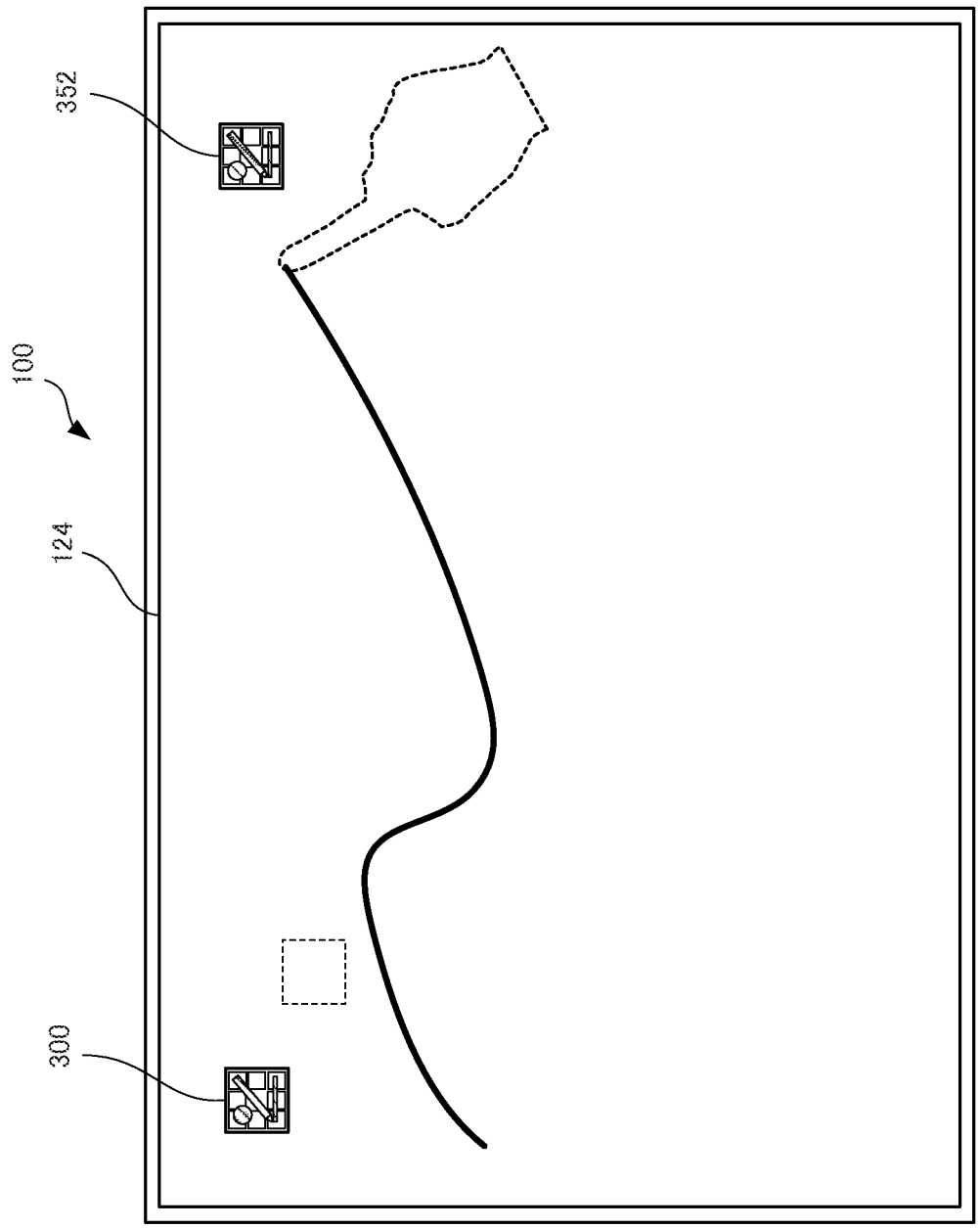

IMAGE DISPLAY APPARATUS HAVING TOUCH DETECTION AND MENU ERASING

CROSS-REFERENCE TO RELATED APPLICATION

This nonprovisional application claims priority under 35 U.S.C. § 119(a) on Patent Application No. 2014-004060 filed in Japan on Jan. 14, 2014, the entire contents of which are hereby incorporated by reference.

BACKGROUND OF THE INVENTION

Field of the Invention

The present invention relates to a touch-operable image display apparatus and, more specifically, to an image display apparatus having a user interface facilitating touch operation by a pen, as well as to a method of operating the same.

Description of the Background Art

An image display apparatus provided with a touch-panel display has been known. Recently, such apparatuses come to have larger and larger screens, and come to be used for various purposes. By way of example, such an apparatus is used as an electronic blackboard apparatus used for a meeting or for presentation.

As a user interface, icons for pen operations are arranged on a peripheral portion of the display screen. By way of example, icons allowing settings related to drawing, or a plurality of icons for selecting prescribed operations are arranged vertically along a left or right side of the display screen. By touching these icons with a pen, it is possible for the user to set up conditions for drawing (line color and thickness, or eraser operation) or to select an operation such as mode switching. The user interface as such can be displayed or erased by an operation by the user.

Conventionally, various methods of improving operability of a touch-panel have been proposed. By way of example, Japanese Patent Laying-Open No. 8-95737 (hereinafter referred to as '737 Reference) discloses a method of improving operability of a digitizer that allows development of an operation menu and the like on a display using a coordinates indicator such as an input pen. Specifically, this reference discloses a technique of displaying an operation menu in a concentric shape with the position touched by the pen being the center.

Japanese Patent Laying-Open No. 6-289984 (hereinafter referred to as '984 Reference) discloses a technique of displaying, in a pop-up manner, an edit menu in the vicinity of a pen tip, in a document creating and editing device allowing hand-writing gesture operation with a pen. Specifically, when a prescribed scope of a document is designated by a pen, a pop-up menu is displayed. When the pop-up menu is touched, corresponding edit process is executed, and then, the pop-up menu is erased. Here, if an area outside the pop-up menu is touched, the edit process is cancelled, and the pop-up menu is erased.

Japanese Patent Laying-Open No. 2-292617 (hereinafter referred to as '617 Reference) discloses a device for detecting a position of pen operation to prevent, when one computer is shared by a plurality of users, interference to working environment of other users. Specifically, according to the disclosed technique, when a plurality of pens are used for operations, different codes are allocated to the pens so that the pens are distinguished from each other, and operations are controlled differently in accordance with the types of pens (users are distinguished or pen colors are distinguished).

Though various user interfaces for touch operations using pens have been proposed as exemplified above, there is still a room for improvement. Particularly, in an image display apparatus with a large display screen, typically, icons for operation are fixedly arranged on the peripheral portion of the screen where the object of processing, such as a drawing, is not displayed. Therefore, operability for the user is not very satisfactory.

By way of example, even if the icons for operation are displayed on the peripheral portion of the display screen, such icons may be an eyesore or annoying, if the icons are kept displayed even when users do not use pens. If the drawing color or the like of the pen is to be changed, it is necessary to touch an icon displayed far at the peripheral portion of the screen, which may be troublesome. Particularly when the screen in large, the user must move as far as the peripheral portion, which is burdensome. Further, whether the user interface is to be displayed or not must also be switched by the user, and this is also troublesome.

When an image display apparatus allowing use of a plurality of pens is realized, a user interface for settings must be prepared on a pen-by-pen basis and, if the user interfaces for all the pens used are to be displayed at one time, the area occupied by the interfaces on the screen would be considerable. On the other hand, if one user interface is to be displayed at one time, switching of user interface pen by pen is necessary, which is troublesome.

The techniques discussed in '737, '984 and '617 References are not directed to the drawing process with a pen on an image display apparatus with a large display screen, and hence, these references do not provide any solution to the problems described above.

SUMMARY OF THE INVENTION

In view of the problems described above, it is desirable to provide an image display apparatus having a user interface allowing easy settings for pen touch operations, particularly for a drawing operation, as well as to provide a method of operating the same.

According to a first aspect, the present invention provides an image display apparatus, including: a display unit displaying an image: a touch detecting unit detecting a touch operation by a touch pen, superposed on the display unit; a control unit executing a process allocated to the touch operation detected by the touch detecting unit; and a receiving unit receiving a prescribed first information item transmitted from the touch pen, when the touch pen detects that the touch pen is held by a user. In response to the receiving unit receiving the first information item, the display unit displays a partial image indicating a state of settings related to the process allocated to the touch operation by the touch pen.

Thus, when a user is to conduct a touch operation with a touch pen, a partial image displaying the state of settings for the pen operation is displayed at the time point when the user holds the pen. Therefore, it is possible for the user to easily confirm what process is currently allocated to the pen operation.

Preferably, the receiving unit receives the first information item from each of a plurality of touch pens, and the first information item is an information item uniquely given to each of the plurality of touch pens. The display unit displays a plurality of partial images in one to one correspondence with each of the plurality of first information items received by the receiving unit.

In this manner, when a plurality of touch pens are used, each touch pen transmits the unique first information (ID) and, therefore, it is possible to display the partial image corresponding to each touch pen. Thus, it is possible for each user to easily confirm the settings information related to the pen he/she is using.

More preferably, the display unit displays, in response to the touch detecting unit detecting the partial image being touched by a corresponding one of the touch pens, a menu image allowing change of the state of settings related to a process allocated to the touch operation, in relation to the touched partial image; and if the process allocated to the touch operation by the touch pen is a drawing process, erases the menu image when the touch operation by the touch pen is started.

In this manner, when the partial image is touched by the touch pen, the menu allowing change of settings for the pen operation is displayed. Thus, the user can easily change the settings of pen operation. Since the menu is erased during the touch operation, easy touch operation is possible, not hindered by the menu.

More preferably, after the control unit executes the process allocated to the touch operation by the touch pen, when a touch by the touch pen comes to be no longer detected by the touch detecting unit, the display unit moves the partial image corresponding to the touch pen of which touch comes to be no longer detected, to a position within a prescribed scope from the position where the touch detecting unit last detected the touch.

Thus, after finishing one touch operation, the user can easily change the settings for the touch operation.

Preferably, in response to the touch detecting unit detecting a prescribed touch operation to which any process executed by the control unit is not allocated, by the touch pen corresponding to the displayed partial image, on an area outside the displayed partial image, the display unit moves the displayed partial image to the position where the prescribed touch operation is detected.

Thus, it is possible for the user to move the partial image that is displayed at a position out of reach to his/her side, and to easily change the settings for the touch operation.

More preferably, the receiving unit receives a prescribed second information item transmitted from the touch pen being touch-operated; and in response to the touch detecting unit detecting a prescribed touch operation to which any process executed by the control unit is not allocated, while the receiving unit is not receiving the second information item, the display unit displays a partial image, different from the partial image corresponding to the touch pen, indicating the state of settings related to a process executed by the control unit.

In this manner, when the touch operation is done by the touch pen, the touch pen transmits the second information (switch-on information) and, therefore, the partial image representing the state of settings can be displayed even for the touch operation by the user's finger. Thus, it is possible for the user to easily confirm what process is currently allocated to the touch operation by his/her finger.

According to a second aspect, the present invention provides an image display apparatus, including: a display unit displaying an image: a touch detecting unit detecting a touch operation, superposed on the display unit; and a control unit executing a process allocated to the touch operation detected by the touch detecting unit. In response to the touch detecting unit detecting a prescribed touch operation to which any process executed by the control unit is not allocated, the display unit displays a partial image indicating a state of settings related to a process executed by the control unit.

Thus, the partial image representing the state of settings for the touch operation by the user's finger can be displayed, and it is possible for the user to easily confirm what process is currently allocated to the touch operation by his/her finger.

Preferably, the prescribed touch operation to which any process executed by the control unit is not allocated is a long tap.

According to a third aspect, the present invention provides a method of operating an image display apparatus, including the steps of: displaying an image; detecting a touch operation by a touch pen on the displayed image; executing a process allocated to the detected touch operation; receiving a prescribed first information item transmitted from the touch pen when the touch pen detects that the touch pen is held by a user; and in response to reception of the first information item, displaying a partial image indicating a state of settings related to the process allocated to the touch operation by the touch pen.

Thus, when a user is to conduct a touch operation with a touch pen, a partial image displaying the state of settings for the pen operation is displayed at the time point when the user holds the pen. Therefore, it is possible for the user to easily confirm what process is currently allocated to the pen operation.

By the present invention, when a user is to conduct a touch operation with a touch pen, a partial image (indicator) displaying the state of settings for the pen operation is displayed at the time point when the user holds the pen. Therefore, it is possible for the user to easily confirm the current state of settings for the pen operation. Further, it is possible to easily change the settings using the displayed menu.

Further, when the user makes a prescribed touch operation (long tap) with his/her finger, the partial image (indicator) is displayed and, therefore, it is possible for the user to easily confirm the current state of settings for the touch operation by his/her finger.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 shows the display screen of the image display apparatus on which an indicator is displayed by a long tap by one's finger.

FIG. 20 shows the display screen of the image display apparatus when the finger is moved away from the touch-panel after drawing by the finger.

DESCRIPTION OF THE PREFERRED EMBODIMENTS

Figure 1:
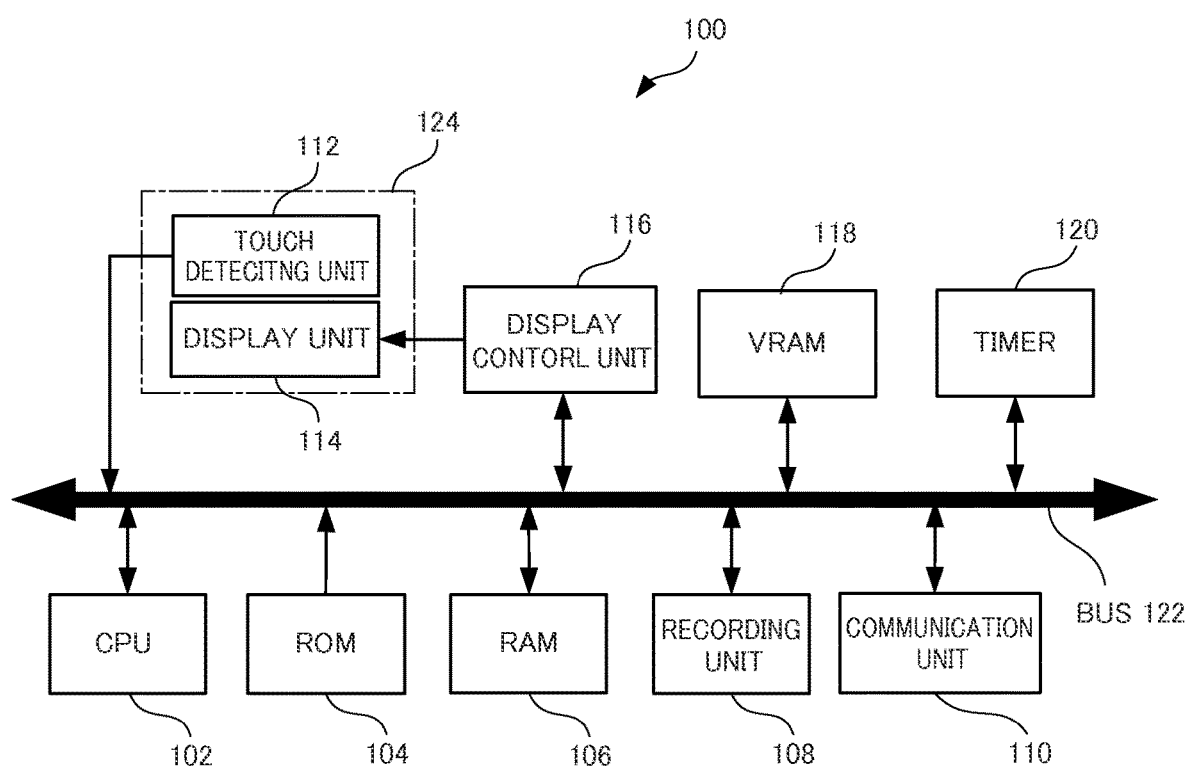
FIG. 1 is a block diagram schematically showing a configuration of an image display apparatus in accordance with a first embodiment of the present invention.

In the following, the same components are denoted by the same reference characters. Their names and functions are also the same. Therefore, detailed description thereof will not be repeated.

First Embodiment

Referring to FIG. 1, an image display apparatus 100 in accordance with the first embodiment of the present invention includes: a central processing unit (hereinafter denoted as CPU) 102; a read-only memory (hereinafter denoted as ROM) 104; a random access memory (hereinafter denoted as RAM) 106; a recording unit 108; a communication unit 110; a touch detecting unit 112; a display unit 114; a display control unit 116; a video memory (hereinafter denoted as VRAM) 118; a timer 120, and a bus 122. CPU 102 is for overall control of image display apparatus 100.

ROM 104 is a non-volatile storage storing programs and data necessary for controlling operations of image display apparatus 100. RAM 106 is a volatile storage from which data is erased when power supply is stopped. Recording unit 108 is a non-volatile storage retaining data even when power conduction is shut off, and implemented, for example, by a hard disk drive, a flash memory or the like. Recording unit 108 may be configured as a detachable unit. CPU 102 reads a program from ROM 104 to RAM 106 through bus 122 and executes the program using a part of RAM 106 as a work area. CPU 102 controls various units and components of image display apparatus 100 in accordance with a program or programs stored in ROM 104.

To bus 122, CPU 102, ROM 104, RAM 106, recording unit 108, touch detecting unit 112, display control unit 116, VRAM 118 and timer 120 are connected. Data (including control information) is exchanged among the units through bus 122.

Display unit 114 is a display panel (such as a liquid crystal panel) for displaying images. Display control unit 116 is provided with a driving unit for driving display unit 114. Display control unit 116 reads image data stored in VRAM 118 at prescribed timing, generates signals for displaying as an image on display unit 114, and outputs the generated signals to display unit 114. The image data to be displayed is read by CPU 102 from recording unit 108 and transmitted to VRAM 118.

Touch detecting unit 112 is, for example, a touch-panel, detecting a touch operation by a user. Touch detecting unit 112 is arranged superposed on the display screen of display unit 114. The touch on touch detecting unit 112 is an operation of designating a point of an image displayed on the display screen, corresponding to the touched position. In the following, touch detecting unit 112 and display unit 114 will be referred to as a touch-panel display 124. Detection of a touch operation when the touch-panel is used for touch detecting unit 112 will be described with reference to FIG. 2.

Communication unit 110 is for receiving information transmitted in a wireless manner from a touch pen (hereinafter also simply referred to as a pen), as will be described later. The method of communication may be a method in compliance with known standards such as Wi-Fi or Bluetooth (registered trademark), or a communication method of a unique standard. Communication unit 110 may have an NIC (Network Interface Card) for connection to the outside, such as to a network, and it may transmit/receive image data to/from a computer connected to the network. The image data received from the outside through communication unit 110 is recorded in recording unit 108. A print instruction to an image forming apparatus such as a printer connected to the network is given through communication unit 110.

Timer 120 executes a time measuring process, and upon request from CPU 102, it transmits information representing the current time (hereinafter also referred to as the current time) to CPU 102. When a reset request is received from CPU 102, timer 120 clears the time information (sets the current time to zero), and restarts the time measuring process.

Image display apparatus 100 shown in FIG. 1 is not limited to an integrated configuration having all components arranged adjacent to each other. By way of example, touch detecting unit 112 and display unit 114 may be arranged as an integrated body, and other components may be arranged separate from touch detecting unit 112 and display unit 114. By way of example, components other than touch detecting unit 112 and display unit 114 may be a general purpose computer capable of outputting a prescribed video signal. In that case, the video signal output from the general purpose computer may be transmitted in a wireless manner to display unit 114, and the output signal from touch detecting unit 112 may be transmitted through a cable or by a wireless manner to the general purpose computer.

To various units and components of image display apparatus 100, electric power of a prescribed voltage, converted from an external commercial power source is supplied.

Figure 2:
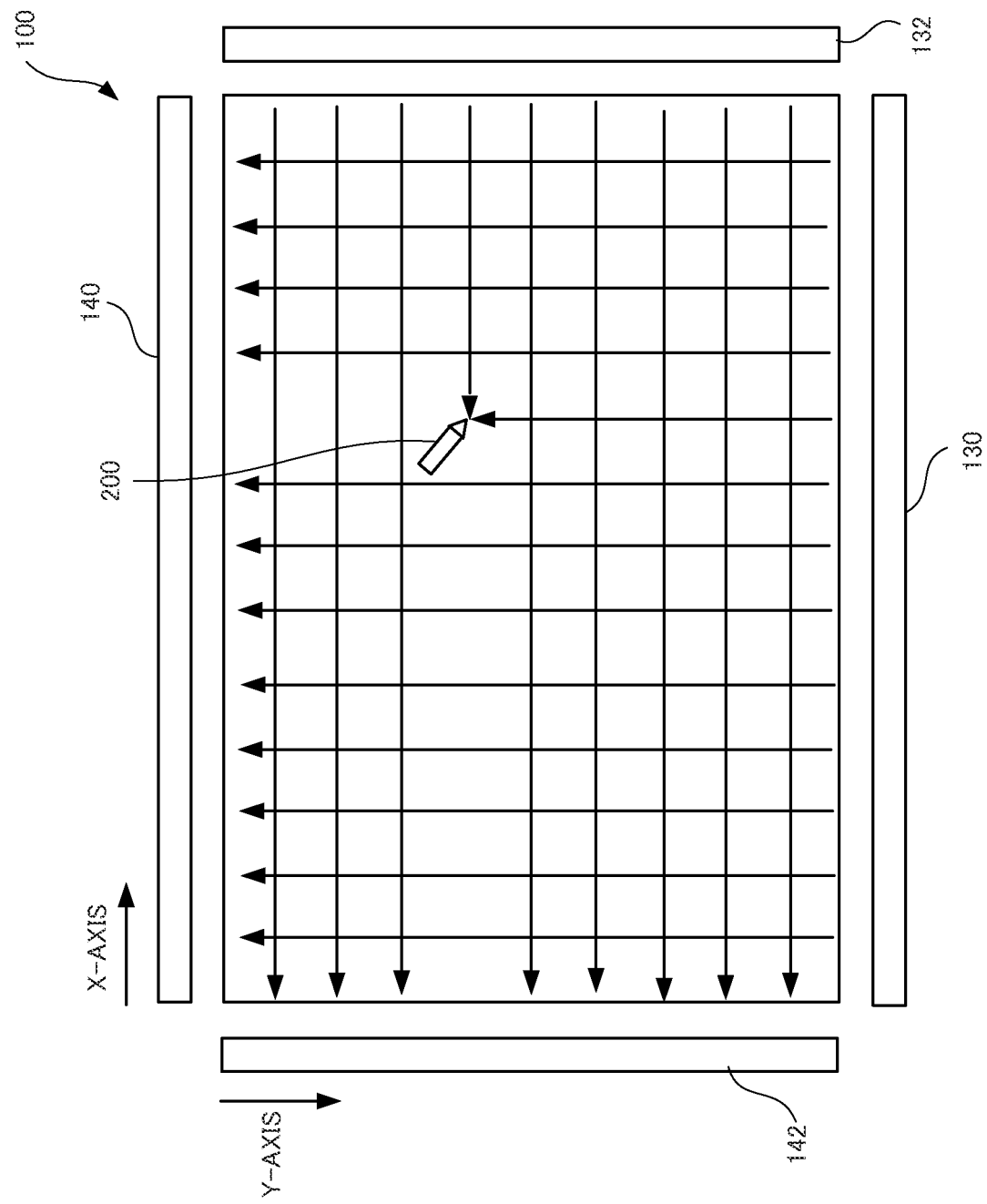
FIG. 2 shows an example of a method of detecting a touch input.

FIG. 2 shows an infrared scanning type touch-panel (touch detecting unit 112). The touch-panel has arrays of light emitting diodes (hereinafter denoted as LED arrays) 130 and 132 arranged in a line on adjacent two sides of a rectangular writing surface, respectively, and two arrays of photodiodes (hereinafter referred to as PD arrays) 140 and 142 arranged in a line opposite to LED arrays 130 and 132, respectively. Infrared rays are emitted from each LED of LED arrays 130 and 132, and the infrared rays are detected by each PD of opposite PD arrays 140 and 142. In FIG. 2, infrared rays output from LEDs of LED arrays 130 and 132 are represented by arrows.

The touch-panel includes, for example, a micro computer (a device including a CPU, a memory and an input/output circuit), and controls emission of each LED. Each PD outputs a voltage corresponding to the intensity of received light. The output voltage from the PD is amplified by an amplifier. Since signals are output simultaneously from the plurality of PDs of PD arrays 140 and 142, the output signals are once saved in a buffer and then output as serial signals in accordance with the order of arrangement of PDs, and transmitted to the micro computer. The order of serial signals output from PD array 140 represents the X coordinate. The order of serial signals output from PD array 142 represents the Y coordinate.

When a user touches a point on the touch-panel with a touch pen 200, the infrared ray is intercepted by the tip of touch pen 200. Therefore, the output voltage of PD that has been receiving the infrared ray before the interception drops. Since the signal portion from the PD that corresponds to the touched position (XY coordinates) decreases, the micro computer detects a portion where the signal levels of received two serial signals decreased, and thereby finds the position coordinates of the touched position. The micro computer transmits the determined position coordinates to CPU 102. The process for detecting the touched position is repeated periodically at prescribed detection interval and, therefore, if one point is kept touched for a time period longer than the detection interval, it follows that the same coordinate data is output repeatedly. If no position is touched, the microcomputer does not transmit the position coordinates. The touched position can be detected in the similar manner when the user touches touch detecting unit 112 with his/her finger without using touch pen 200.

The technique for detecting the touched position described above is well known and, therefore, further description will not be given here. A touch-panel other than the infrared scanning type panel (such as a capacitive type, surface acoustic wave type or resistive type touch-panel) may be used as touch detecting unit 112.

Figure 3:
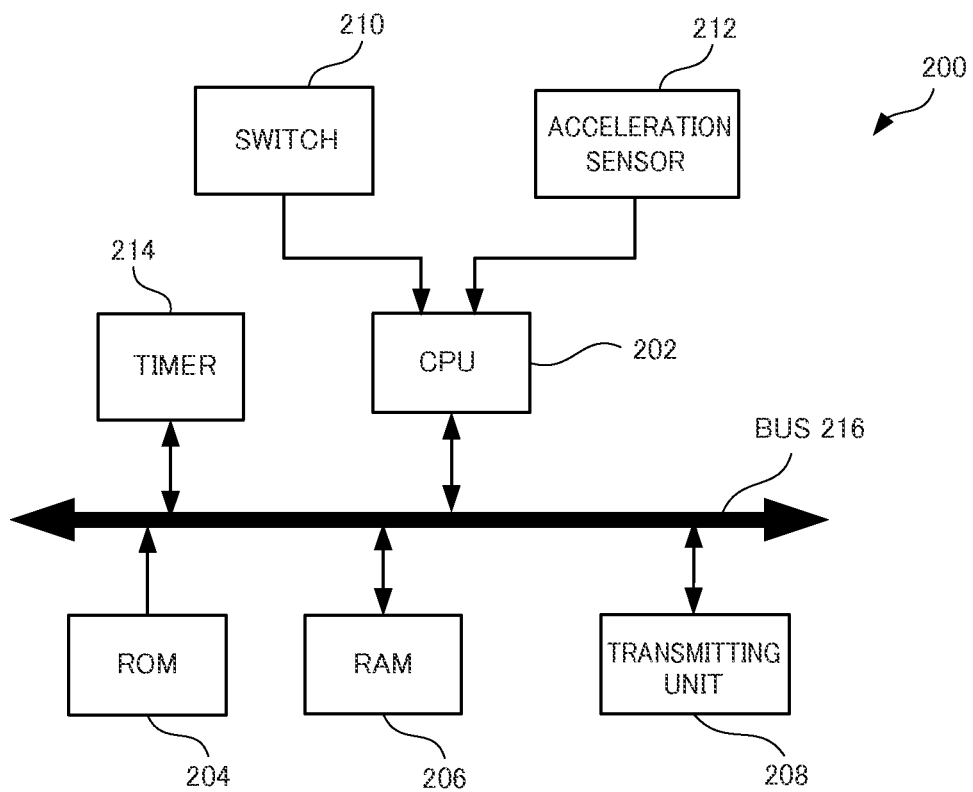
FIG. 3 is a block diagram schematically showing a configuration of a touch pen for operating the image display apparatus of FIG. 1.

Referring to FIG. 3, touch pen 200 includes a CPU 202, an ROM 204, an RAM 206, a transmitting unit 208, a switch 210, an acceleration sensor 212, a timer 214, and a bus 216. CPU 102 is for overall control of touch pen 200.

ROM 204 is a non-volatile storage storing programs and data necessary for controlling operations of touch pen 200 and an ID of touch pen 200. The ID represents data uniquely allocated to touch pen 200. RAM 206 is a volatile storage from which data is erased when power supply is stopped. CPU 202 reads a program from ROM 204 and loads it to RAM 206 through bus 216 and executes the program using a part of RAM 206 as a work area. CPU 202 controls various units and components of touch pen 200 in accordance with a program or programs stored in ROM 204.

To bus 216, CPU 202, ROM 204, RAM 206, transmitting unit 208, and timer 214 are connected. Data (including control information) is exchanged among the units through bus 216.

Figure 4:
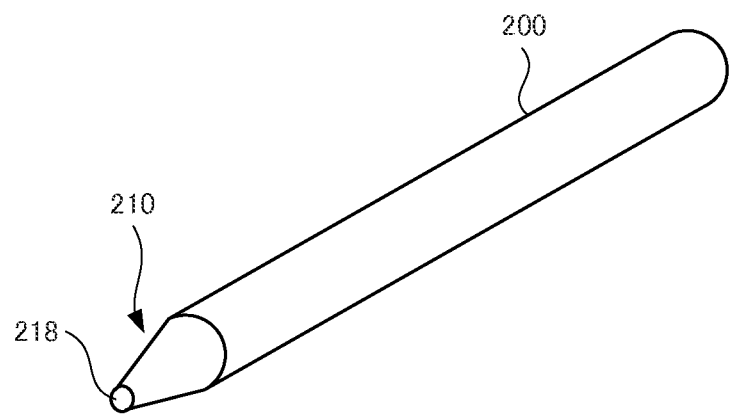
FIG. 4 is a perspective view showing the touch pen of FIG. 3.

Referring to FIG. 4, a switch 210 is arranged near a tip end of touch pen 200. Switch 210 is a momentary switch that turns on temporarily when the tip end portion 218 is pressed. By way of example, when tip end portion 218 of touch pen 200 is pressed on touch detecting unit 112 of image display apparatus 100, switch 210 turns on. When tip end portion 218 of touch pen 200 is moved away from touch detecting unit 112 of image display apparatus 100, switch 210 turns off. When switch 210 turns on, a prescribed signal is input from switch 210 to CPU 202. For example, when switch 210 turns on, an output signal from switch 210 changes from a low level to a high level. Thus, CPU 202 can detect turning on/off of switch 210.

An acceleration sensor 212 is a sensor for detecting acceleration, provided fixed inside touch pen 200. Acceleration sensor 212 can detect a state in which the position of touch pen 200 is being changed by external force. By way of example, when the user holds touch pen 200 that has been in a stationary state, acceleration sensor 212 detects acceleration, and outputs a signal at a high level. When the user puts down touch pen 200 and touch pen 200 gets still, the signal from acceleration sensor returns to a low level. In this manner, CPU 202 can detect a state in which the user holds and to use touch pen 200, or a state in which the pen 200 is being used.

Timer 214 executes a time measuring process, and upon request from CPU 202, it transmits information representing the current time to CPU 202. When a reset request is received from CPU 202, timer 214 clears the time information, and restarts the time measuring process.

Transmitting unit 208 is for transmitting information in a wireless manner to image display apparatus 100. CPU 202 controls transmitting unit 208 such that information related to touch pen 200 is transmitted. The transmitted information includes the ID of touch pen 200, information representing that switch 210 is on, detected by CPU 202, and information representing that acceleration is detected by acceleration sensor 212.

Touch pen 200 contains a power source (not shown) for supplying power to various units. The power source is, for example, a battery.

In the present embodiment, image display apparatus 100 changes a user interface displayed on display unit 114, in accordance with a touch operation to touch detecting unit 112 by touch pen 200. In the following, this operation will be described.

Figure 5:
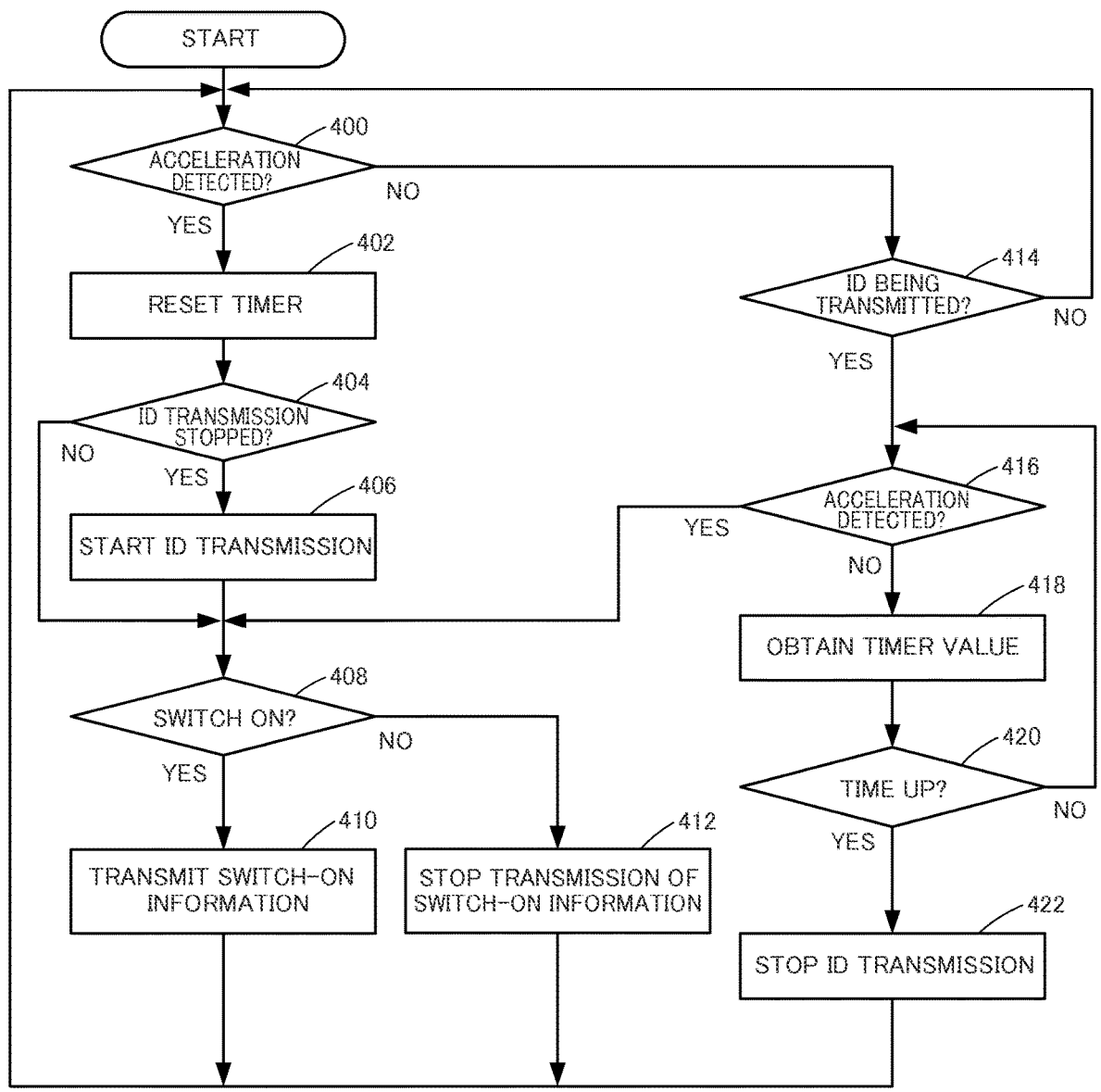
FIG. 5 is a flowchart representing a control structure of a program executed in the touch pen shown in FIG. 3.

Referring to FIG. 5, a description will be given of a program for transmitting information related to the operation of touch pen 200, that is, related to the state of touch pen 200 operated by the user. The program is activated when power supply to touch pen 200 is started, and continuously executed while the power is being supplied.

At step 400, CPU 202 determines whether or not acceleration is detected by acceleration sensor 212. Specifically, if the signal input from acceleration sensor 212 is at the high level, CPU 202 determines that acceleration is detected. If it is determined that acceleration is detected, the control proceeds to step 402. Otherwise, the control proceeds to step 414.

At step 402, CPU 202 resets timer 214.

A step 404, CPU 202 determines whether or not a process for transmitting an ID from transmitting unit 208 is stopped. Transmission of the ID starts at a step that will be described later, and when step 404 is executed for the first time, it is determined that the transmission of the ID is stopped. If the transmission of the ID is determined to be stopped, the control proceeds to step 406. Otherwise (the ID is being transmitted), the control proceeds to step 408.

At step 406, CPU 202 reads the ID from ROM 204, and controls transmitting unit 208 such that transmission of the ID to image display apparatus 100 starts. Transmitting unit 208 continues transmission until an instruction to stop transmission is received from CPU 202.

At step 408, CPU 202 determines whether or not switch 210 is on. Specifically, when the signal input from switch 210 is at the high level, switch 210 is determined to be on. If switch 210 is determined to be on, the control proceeds to step 410. Otherwise, or if the signal input from switch 210 is at the low level (switch 210 is off), the control proceeds to step 412.

At step 410, CPU 202 controls transmitting unit 208 such that transmission of information representing that the switch is on (hereinafter also referred to as switch-on information) to image display apparatus 100 is started. Thereafter, the control returns to step 400. The switch-on information is, for example, "1".

At step 412, CPU 202 controls transmitting unit 208 such that transmission of switch-on information to image display apparatus 100 is stopped. Thereafter, the control returns to step 400.

If it is determined at step 400 that any acceleration is not detected, at step 414, CPU 202 determines whether or not a process of transmitting the ID from transmitting unit 208 is being executed. If it is determined that the ID is being transmitted, the control proceeds to step 416. Otherwise, the control returns to step 400.

At step 416, CPU 202 determines whether or not acceleration is detected by acceleration sensor 212, as at step 400. If it is determined that acceleration is detected, the control proceeds to step 408. Otherwise, the control proceeds to step 418.

At step 418, CPU 202 obtains the current value of time (current time measured after reset at step 402) from timer 214.

At step 420, CPU 202 determines whether or not the time is up without detecting any acceleration. Specifically, CPU 202 determines whether or not the value obtained at step 418 is larger than a prescribed value T0. The prescribed value T0 is stored in advance, for example, in ROM 204. If the value obtained at step 418 is larger than the prescribed value T0, it is determined that the time is up, and the control proceeds to step 422. Otherwise, the control returns to step 416.

At step 422, CPU 202 controls transmitting unit 208 such that transmission of the ID to image display apparatus 100 is stopped. Thereafter, the control returns to step 400.

As can be seen from the foregoing, in the initial state in which touch pen 200 is stationary, the ID signal is not transmitted. When the user holds touch pen 200, transmission of the ID starts (step 406). After the transmission of ID started (being transmitted), when the user touches touch detecting unit 112 of image display apparatus 100 with the tip end portion 218 of touch pen 200, the switch-on information is transmitted (step 410). When the user moves the tip end portion 218 of touch pen 200 away from touch detecting unit 112 of image display apparatus 100, transmission of switch-on information stops (step 412).

When user puts down touch pen 200, detection of acceleration stops. Though the acceleration is not detected, transmission of the ID is maintained for a prescribed time period T0. Specifically, after the acceleration is last detected and timer 214 is reset, if the prescribed time period T0 passes without detecting any acceleration (steps 416 to 420 are repeated), transmission of the ID is stopped (step 422).

Here, the ID and the switch-on information may be individually transmitted from transmitting unit 208, or these may be transmitted as data configured in accordance with a prescribed rule (packet data). By way of example, an area for setting the ID and an area for setting the switch-on information may be provided in one packet, and each area may be set to a fixed size and fixed position. For example, by allocating 8 bits to the ID and 1 bit to the switch-on information, an area of continuous 9 bits for the ID and the switch information in this order may be provided.

Referring to FIGS. 6 to 9, a description will be given of a control structure of a program executed by image display apparatus 100 for changing the user interface displayed on display unit 114 in accordance with a touch operation on touch detecting unit 112 by touch pen 200 operated as above.

At step 500, CPU 102 determines whether or not the ID of touch pen 200 is received through communication unit 110. If it is determined to be received, the control proceeds to step 502. Otherwise, the control proceeds to step 516.

At step 502, CPU 102 determines whether or not an indicator is being displayed on display unit 114. The indicator will be displayed at a step that will be described later. Therefore, when step 502 is executed for the first time, the indicator is not displayed. If it is determined to be displayed, the control proceeds to step 508. Otherwise (if the indicator is not displayed), the control proceeds to step 504.

At step 504, CPU 102 reads information related to the indicator (hereinafter also referred to as indicator information) from recording unit 108, and stores it in a prescribed area of RAM 106. The indicator information is stored in advance in recording unit 108.

At step 506, CPU 102 displays the indicator on display unit 114, using the indicator information read at step 504. By way of example, the indicator information includes positional information (position coordinates), settings information allocated to the touch pen (hereinafter also referred to as touch pen settings information), and image data of the indicator. The positional information is used for determining the position where the indicator is to be displayed. The touch pen settings information is for determining contents of operation designated when an operation is made by the touch pen, and it includes, for example, the information related to line thickness and color.

Figure 9:
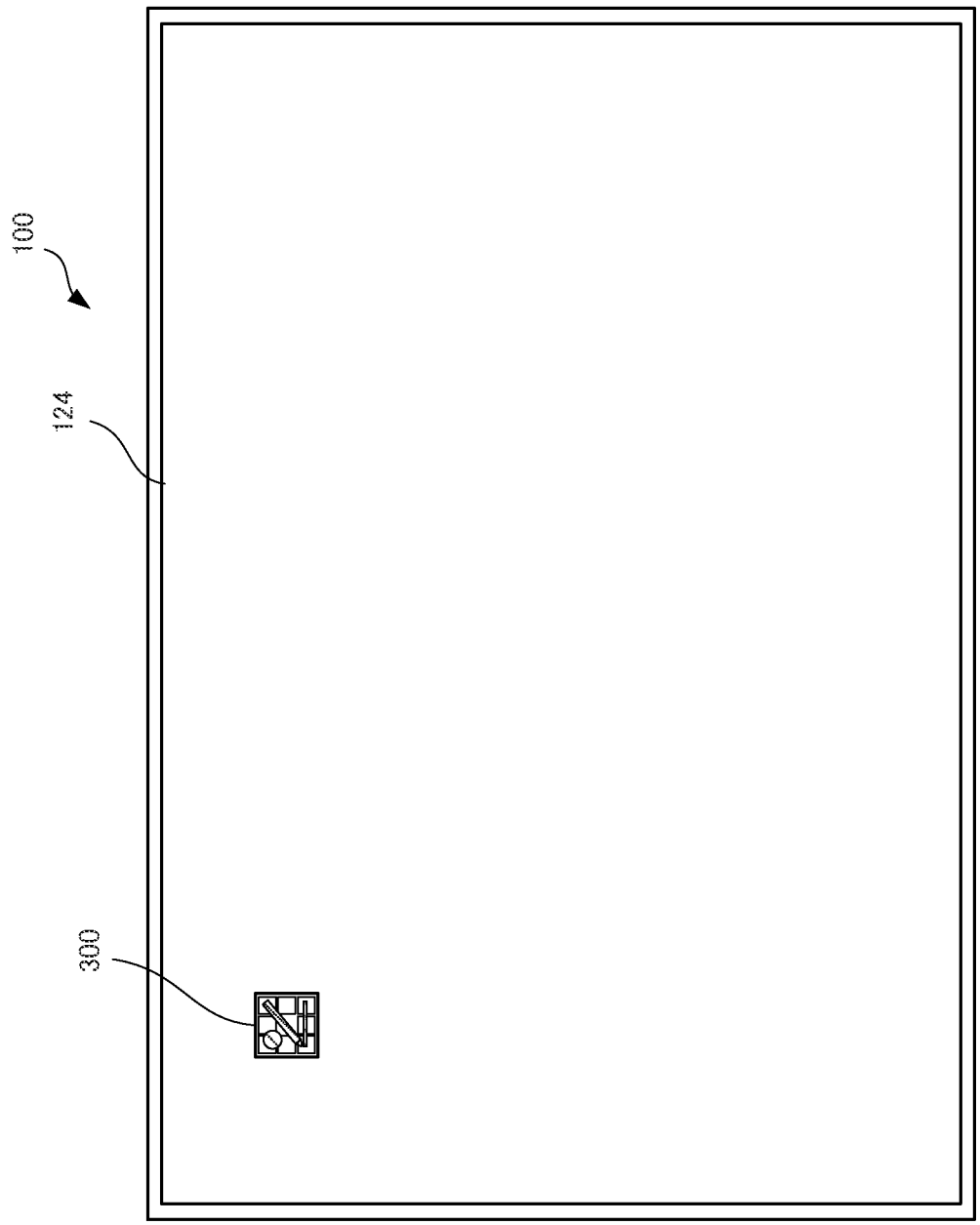
FIG. 9 shows a display screen of the image display apparatus on which an indicator is displayed

Based on the positional information included in the indicator information, CPU 102 determines an area in the VRAM to which the image data of indicator is to be written, and writes the image data of the indicator in the determined area. The image screen data having the image data of indicator written thereto is read by display control unit 116, and displayed as an image on display unit 114. By way of example, an indicator 300 is displayed on touch-panel display 124 (display unit 114) of image display apparatus 100, as shown in FIG. 9.

It is preferred that the indicator is displayed in a manner that allows easy understanding of the state of settings of touch pen 200. By way of example, if it is possible to select a color of drawing by touch pen 200 from among a plurality of colors, it is preferred that a figure in the indicator is displayed in the set color. For example, assuming that the default color of pen is red, an indicator including a figure in red is displayed. In that case, the indicator information may include image data of a plurality of indicators corresponding to settable colors, or it may include one graphic data and a plurality of pieces of color information.

At step 508, CPU 102 determines whether or not touch-panel display 124 is touched. If it is determined to be touched, CPU 102 stores the information of touched position (position coordinates) in a prescribed area of RAM 106, and the control proceeds to step 510. Otherwise, the control proceeds to step 514. The positional information stored in RAM 106 is held until step 508 is again executed.

At step 510, CPU 102 determines whether or not turning on of switch 210 of touch pen 200 is detected. Specifically, CPU 102 determines whether or not the switch-on information has been received from touch pen 200 through communication unit 110. If the switch-on information has been received, it is determined that the switch-on is detected, and the control proceeds to step 512. Otherwise, the control proceeds to step 514.

At step 512, CPU 102 executes a process in accordance with the touch operation using touch pen 200. The process at step 512 (pen touch process) is specifically shown in FIG. 7.

Figure 7:
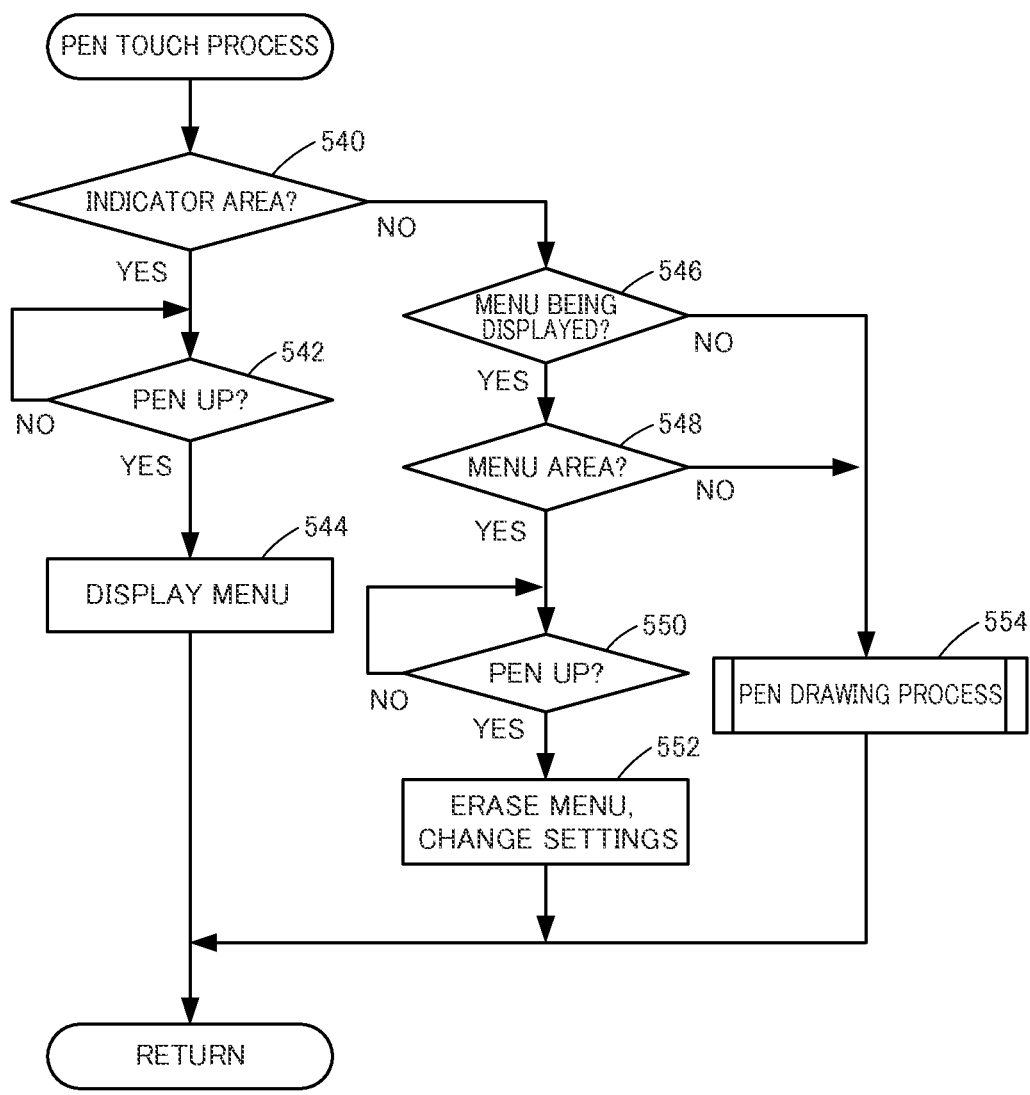
FIG. 7 is a flowchart representing a pen touch process in the flowchart shown in FIG. 6.

At step 540 of FIG. 7, CPU 102 determines whether or not the touched position detected at step 510 is within the area of indicator 300 displayed on display unit 114.

At step 542, CPU 102 determines whether or not touch pen 200 is away from touch-panel display 124 (touch detecting unit 112) (hereinafter also referred to as pen-up state). Step 542 is repeated until the pen-up state is detected. This means that no process is allocated to the long tap of indicator 300.

Figure 10:
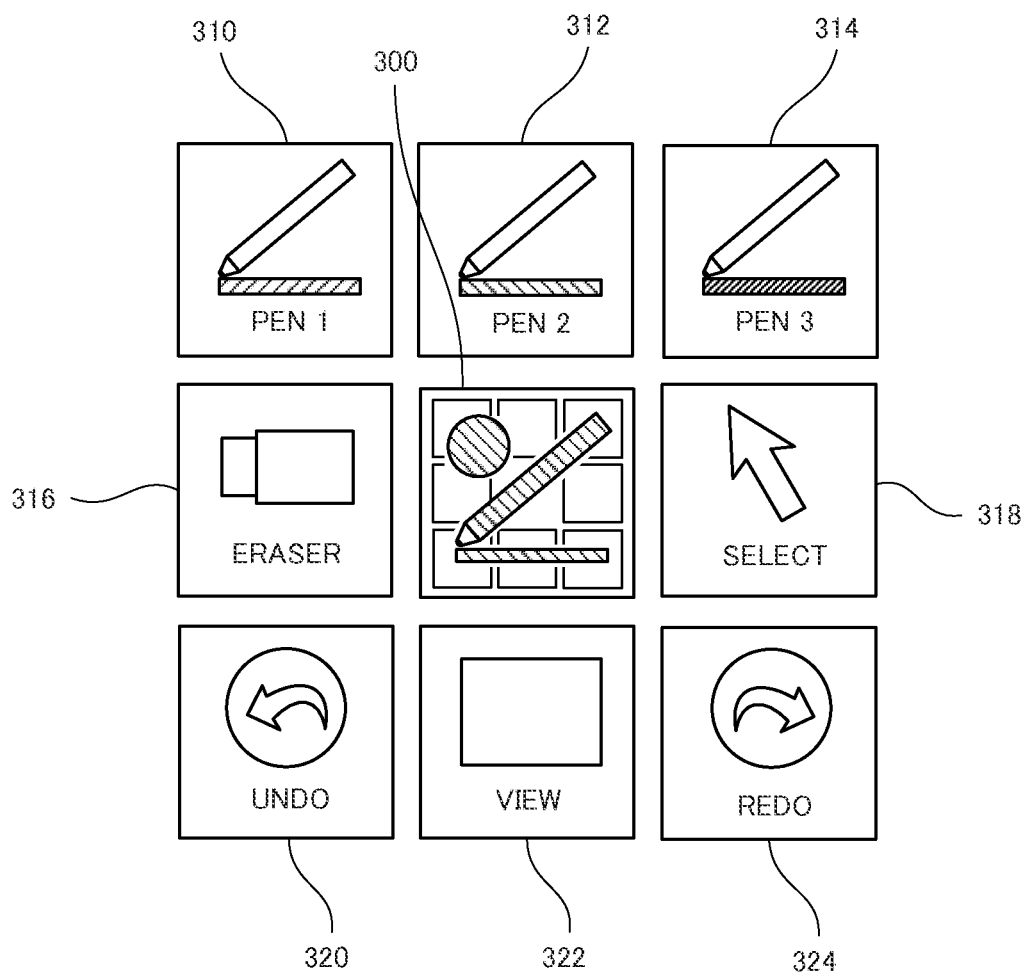
FIG. 10 shows a state in which a menu is displayed around the indicator.

At step 544, CPU 102 displays a menu allowing settings of touch pen 200, in the vicinity of indicator 300. For example, a menu consisting of nine icons 310 to 324 is displayed around indicator 300 that is being displayed on touch-panel display 124, as shown in FIG. 10. Then, the control proceeds to step 514 of FIG. 6.

Referring to FIG. 10, icons 310 to 314 are icons allowing setting of color for drawing with touch pen 200. Icon 316 is an icon designating use of touch pen 200 as an eraser. When icon 316 is touched and thereafter touch-panel display 124 is touched by touch pen 200, the line that has been drawn at the touched position is erased. Icon 318 is for selecting an object, such as a figure, displayed on display unit 114. Icon 320 is an icon for undoing a process executed immediately before and to recover the results of processing. Icon 324 is for redoing the process undone immediately before by the selection of icon 320. Icon 322 is for designating a mode (hereinafter also referred to as a view mode) for operating (enlarging, reducing or moving) an object.

If the touched position detected at step 510 is outside the area of indicator 300, CPU 102 determines whether or not the menu is being displayed, at step 546. If it is determined that the menu is being displayed, the control proceeds to step 548. Otherwise, the control proceeds to step 554.

At step 548, CPU 102 determines whether or not the touched position is in the menu area. Specifically, CPU 102 determines whether the touched position is on any of the icons 310 to 324 shown in FIG. 10. If it is determined that the menu area is touched, the control proceeds to step 550. Otherwise, the control proceeds to step 554.

At step 550, CPU 102 determines whether or not the touch pen 200 is moved away (pen-up), as at step 542. If it is determined to be the pen-up state, the control proceeds to step 552. Otherwise, step 550 is repeated.

At step 552, CPU 102 erases the displayed menu, and changes the settings of touch pen to the setting corresponding to the icon that has been displayed at the touched position. Specifically, the setting data for touch pen 200 included in the indicator information stored in RAM 106 is changed. For example, the state in which the menu is displayed around indicator 300 shown in FIG. 10 is returned to the state of FIG. 9, in which only the indicator 300 is displayed. Thereafter, the control proceeds to step 514 of FIG. 6.

If it is determined at step 546 that the menu is not being displayed, at step 554, CPU 102 executes a drawing process using touch pen 200. The process at step 554 (pen drawing process) is specifically shown in FIG. 8.

Figure 8:
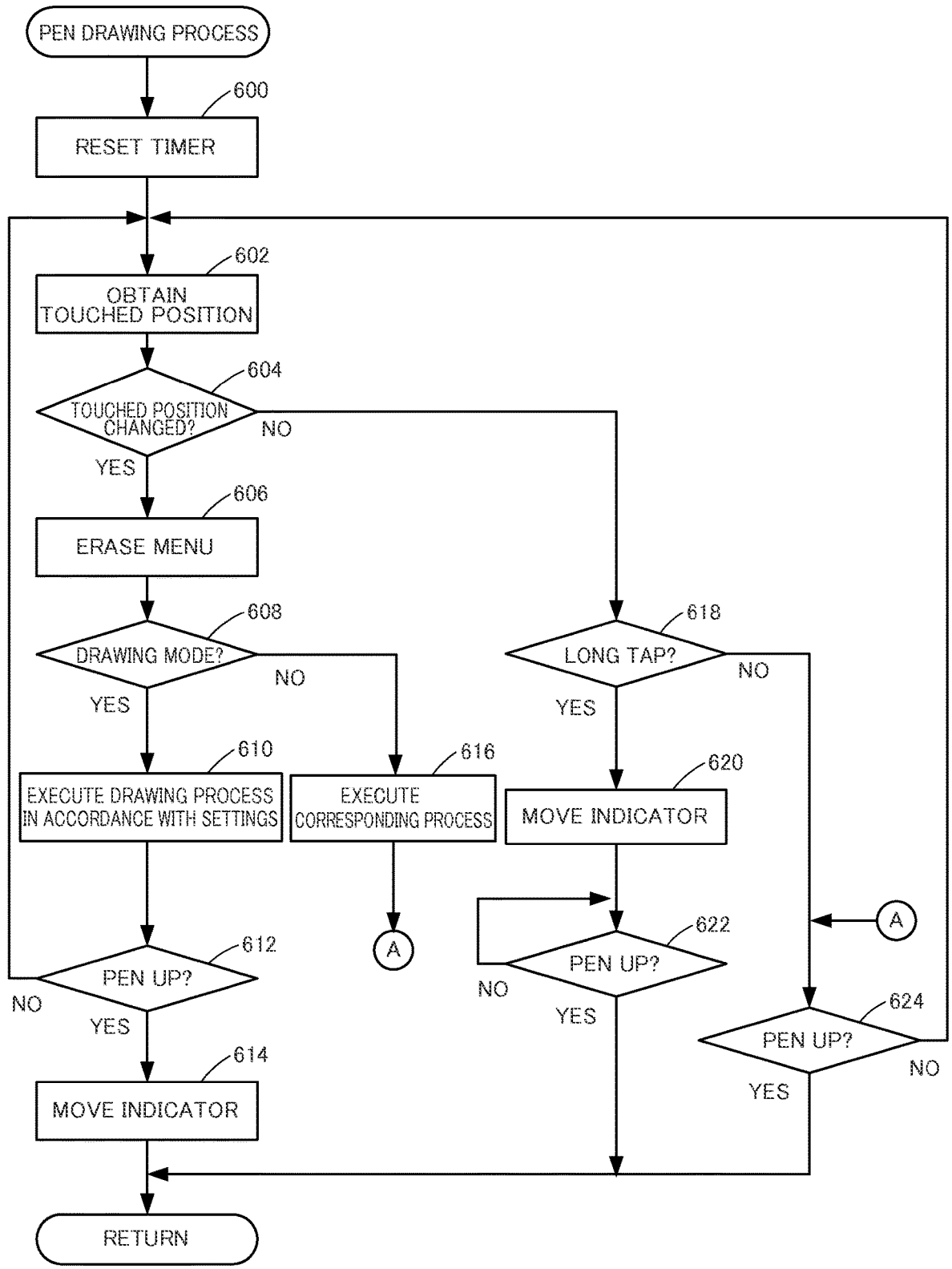
FIG. 8 is a flowchart representing a pen drawing process in the flowchart shown in FIG. 7.

At step 600 of FIG. 8, CPU 102 resets timer 120. This process is for setting the reference time to determine a long tap, which will be described later.

At step 602, CPU 102 obtains the positional information of the touched position. CPU 102 stores the obtained positional information at a prescribed area of RAM 106. As will be described later, step 602 may possibly be executed repeatedly and, at least the positional information obtained last time is retained.

At step 604, CPU 102 determines whether or not the position obtained at step 602 has been changed from the touched position obtained last time. If it is determined to be changed, the control proceeds to step 606. Otherwise, the control proceeds to step 618.

At step 606, CPU 102 erases the menu from screen image of display unit 114. If the menu has not been displayed, the screen image is unchanged.

At step 608, CPU 102 determines whether or not image display apparatus 100 is in the drawing mode. If it is determined to be in the drawing mode, the control proceeds to step 610. Otherwise, the control proceeds to step 616.

In the drawing mode, when touch-panel display 124 (touch detecting unit 112) is touched by touch pen 200 and the touched position changes, a line corresponding to the track of touched positions is drawn on display unit 114. By way of example, if touch pen 200 has settings corresponding to icons 310 to 316, it means that image display apparatus 100 is in the drawing mode. Image display apparatus 100 has the view mode, which is mentioned above, in addition to the drawing mode.

At step 610, CPU 102 executes the drawing process in accordance with the settings of touch pen 200. By way of example, if touched position changes while any of icons 310 to 314 is selected, a line of the corresponding color is drawn.

In this manner, through the process steps of 606 to 610, during the drawing with touch pen 200, the menu disappears and only the indicator 300 is displayed. The drawing process executed at step 610 includes processes other than drawing a line. For example, if the touched position changes while icon 316 is selected, the line that has been drawn on the touched position is erased.

If it is not in the drawing mode, at step 616, CPU 102 executes the corresponding process. For example, in the view mode, if the position touched by touch pen 200 is changed, the selected object moves. Then, the control proceeds to step 624.

At step 612, CPU 102 determines whether or not touch pen 200 is moved away (pen-up). If it is determined to be the pen-up state, the control proceeds to step 614. Otherwise, the control returns to step 602.

Figure 11:
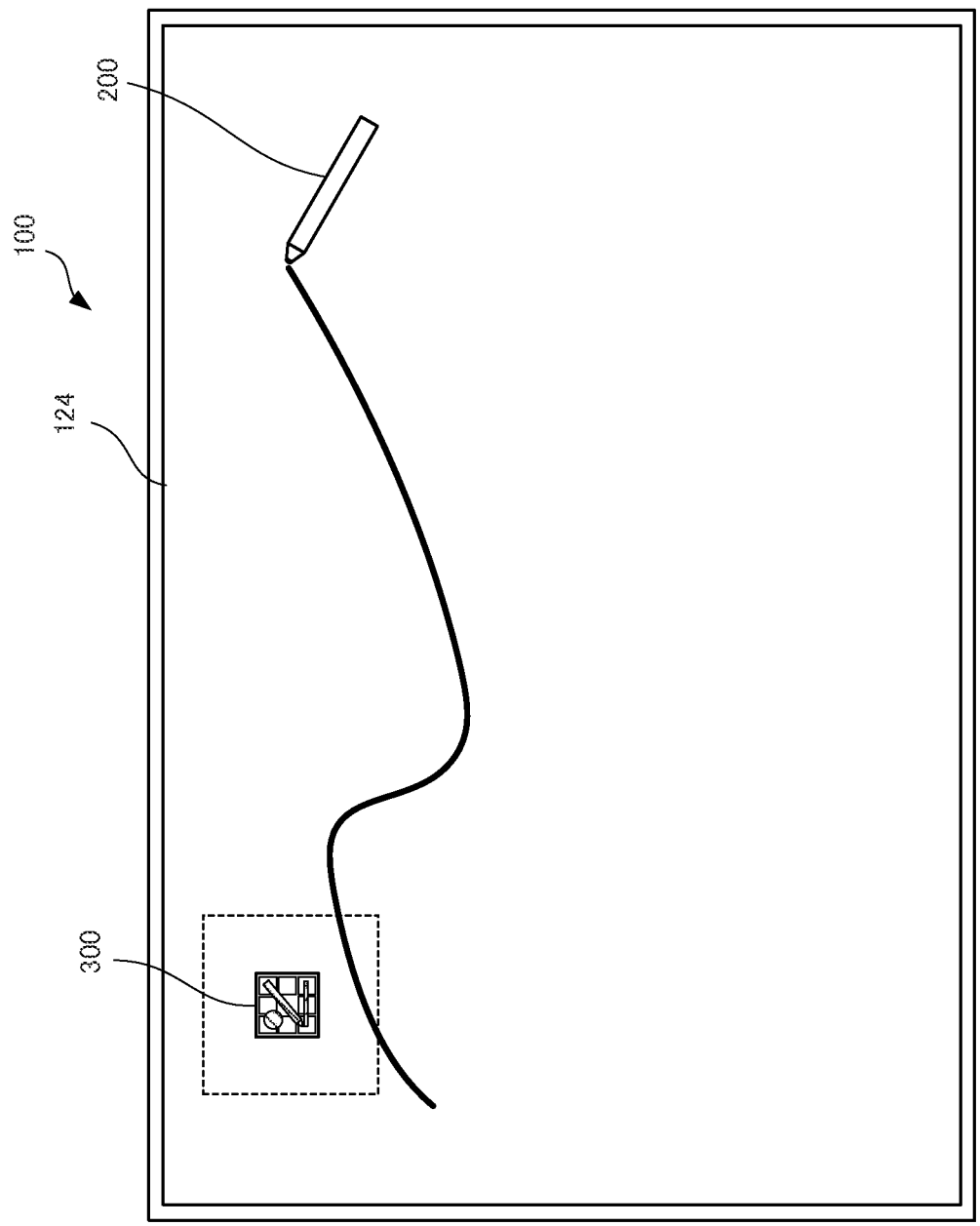
FIG. 11 shows the display screen of the image display apparatus while an image is drawn.
Figure 12:
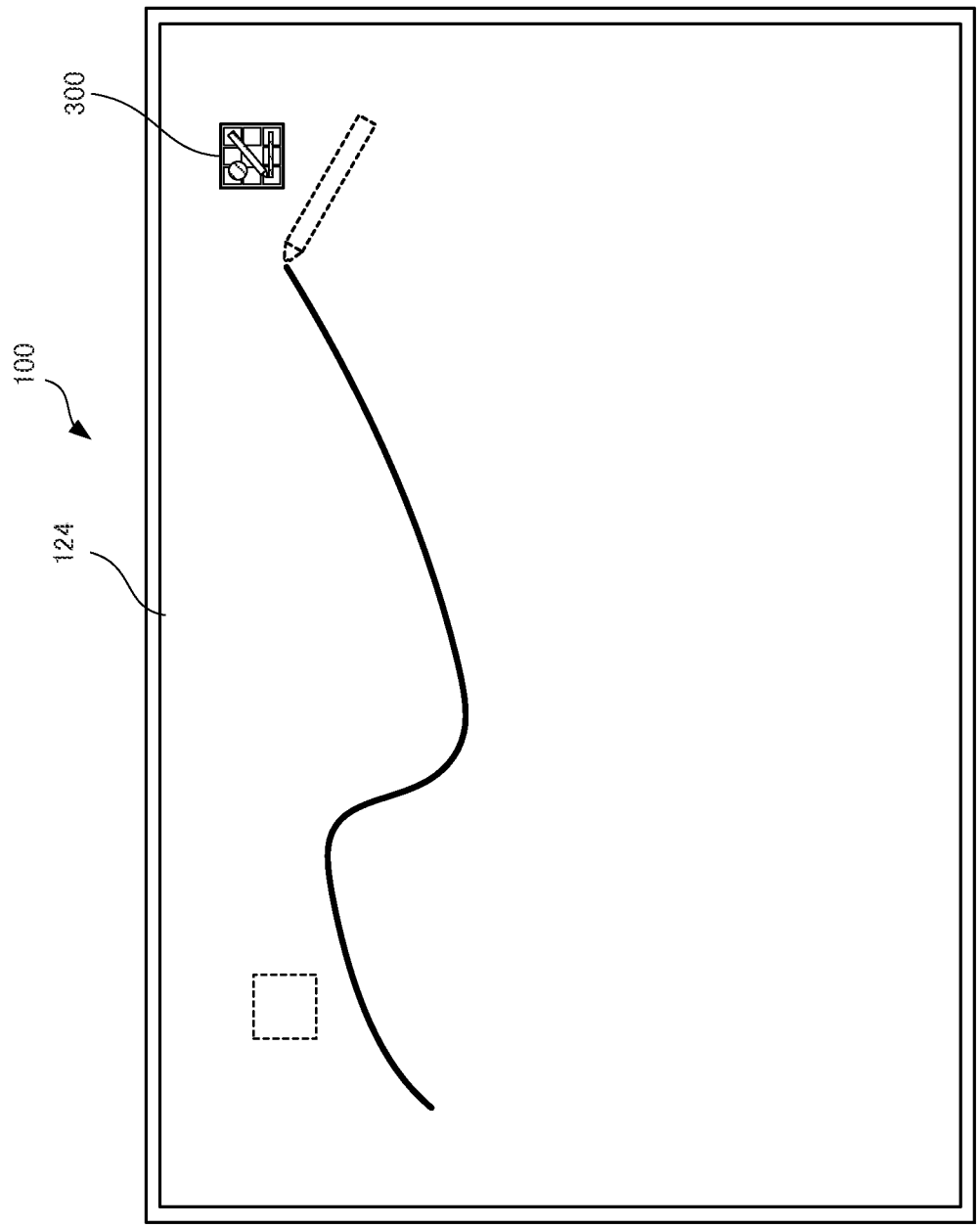
FIG. 12 shows the display screen of the image display apparatus when the touch pen is moved away from the touch-panel after drawing.

At step 614, CPU 102 moves the indicator close to a last touched position. Specifically, CPU 102 reads positional information of the last touched position from RAM 106, once erases the indicator 300 that has been displayed, and displays the indicator 300 again at a position within a prescribed scope from the last touched position (movement of indicator). By way of example, when the tip end portion 218 of touch pen 200 is moved away from touch-penal display 124 in FIG. 11, indicator 300 comes to be displayed near the trailing edge of a drawn line (moved), as shown in FIG. 12. In FIG. 12, touch pen 200 that is lift up is shown in the dotted line.

Here, it is preferred that the newly displayed indicator is not overlapped on the trailing edge (last touched position) of the drawn line. Further, it is preferred to display the new indicator such that if the menu is displayed, the menu is not overlapped on the trailing edge (last touched position) of the drawn line. Therefore, desirably, the indicator is displayed at a position apart from the trailing edge of the drawn line at least by the distance corresponding to the size of the indicator. More preferably, the indicator is displayed at a position apart from the trailing edge of the drawn line at least by the distance corresponding to the size of the whole menu (the area enclosing icons 310 to 324).

When the indicator and the menu are displayed, if the data are overwritten directly on the VRAM 118 corresponding to the drawn line, the original image data will be damaged. To avoid this, the data on VRAM 118 of the area overlapping the indicator and the menu is copied temporarily on a prescribed area of RAM 106, and then the image data of indicator and/or menu is written to VRAM 118. In order to erase the indicator and/or menu, the data that has been copied to RAM 106 is written to the original position of VRAM 118.

If it is determined at step 604 that the touched position is unchanged, at step 618, CPU 102 determines whether or not it is a long tap at the first touched position (corresponding to the positional information stored in RAM 106 at step 510). Specifically, CPU 102 obtains the current timer value (current time measured after reset at step 600) from timer 120, and determines whether or not it is larger than a prescribed value T1 (whether or not the time T1 has passed). The prescribed time T1 is stored in advance in ROM 104. If it is determined that the prescribed time T1 has passed, CPU 102 further determines whether or not the positional information stored in RAM 106 at step 510 is the same as the positional information of the currently touched position. If the two are determined to be the same, or it is determined to be a long tap at the first touched position, the control proceeds to step 620. Otherwise, or if the prescribed time T1 has not yet passed, or if it is a long tap at a position different from the first touched position, the control proceeds to step 624. This prevents erroneous determination of a long tap that causes movement of indicator 300, which will be described later, when the user is drawing a line by touching touch-panel display 124 with touch pen 200 and changing the touched position (even when long tap occurs during the drawing, the screen image does not change).

At step 620, CPU 102 moves indicator 300 to the long-tapped position. Specifically, CPU 102 reads the information of last touched position from RAM 106, temporarily erases indicator 300 that has been displayed, and thereafter, re-displays indicator 300 at the last touched position (long-tapped position).

At step 622, CPU 102 determines whether or not touch pen 200 is up. If it is determined to be the pen-up state, the pen drawing process is terminated (the control proceeds to step 514 of FIG. 6). Otherwise, step 622 is repeated.

At step 624, CPU 102 determines whether or not touch pen 200 is up. If it is determined to be the pen-up state, the pen drawing process is terminated (the control proceeds to step 514 of FIG. 6). Otherwise, the control returns to step 602.

Thus, if the touch is kept at the first touched position, whether or not touch pen 200 is up is repeatedly determined until it is determined to be a long tap, and if touch pen 200 is up before it is determined to be a long tap, the operation exits from the pen drawing process (step 554). Further, even if pressing is continued for the prescribed time period T1 or longer, it is not determined to be a long tap to cause movement of indicator 300 if the touched position has already been changed once (for example, if a line is being drawn).

Returning to FIG. 6, after the pen touch process (step 512), at step 514, CPU 102 determines whether or not an end instruction is received. If it is determined that the end instruction is received, CPU 102 ends the present program. For example, if an end button is pressed, the present program ends. Otherwise, the process returns to step 500.

If the result of determination at step 500 is NO (ID is not received), at step 516, CPU 102 determines whether or not the indicator is being displayed on display unit 114. If it is determined to be displayed, the control proceeds to step 518. Otherwise (the indicator is not displayed), the control returns to step 500.

At step 518, CPU 102 erases indicator 300 that has been displayed. Here, the indicator information stored in RAM 106 is maintained, even if it has been changed at step 552 of FIG. 7.

Figure 6:
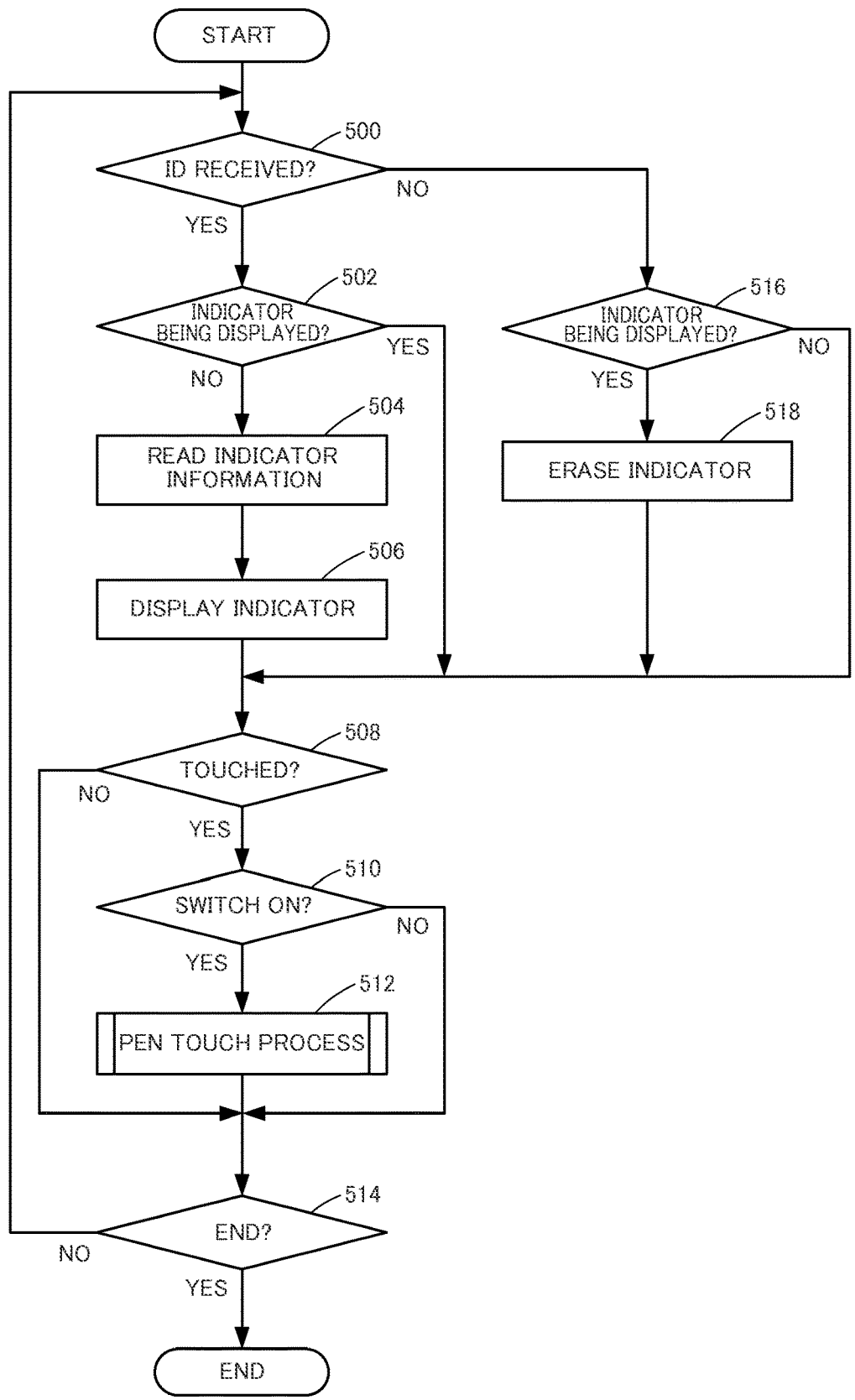
FIG. 6 is a flowchart representing a control structure of a program for realizing the user interface for the touch pen operation in the image display apparatus shown in FIG. 1.

From the foregoing, it is understood that when the user holds touch pen 200, the ID is transmitted from touch pen 200 (step 406 of FIG. 5), image display apparatus 100 receives the ID (determination at step 500 of FIG. 6 is YES), and indicator 300 is displayed (step 506). Thereafter, when the user touches touch-panel display 124 with touch pen 200 (determination at step 510 is YES), the screen image on image display apparatus 100 changes in accordance with the touched position.

Specifically, when the touch is on indicator 300 (determination at step 540 of FIG. 7 is YES), the menu (icons 310 to 324) is displayed (step 544). If any of the items (icons) is touched while the menu is being displayed (determination at step 548 is YES), settings information of touch pen 200 included in the indicator information on RAM 106 is changed, in accordance with the selected item (step 552).

If an area other than the indicator and the menu is touched, the screen image on image display apparatus 100 changes in accordance with the operation of touch pen 200 after the touch. Specifically, when the touched position changes while the touched state is maintained, a process in accordance with the mode is executed. For example, if the operation is in the drawing mode, a line of a color as set for touch pen 200 is drawn (step 610 of FIG. 8), and if it is in the view mode, for example, a selected object moves (step 616). During the drawing, indicator 300 is kept displayed, while the menu is erased (step 606), and if the touch pen is moved away from touch-panel display 124, indicator 300 moves to the vicinity of the position where the touch pen is moved away (step 614). If it is not in the drawing mode, indicator 300 does not move even when the touch pen is up (determination at step 624 executed following step 616 is YES).

If the touched position is not changed but long-tapped (determination at step 618 is YES), indicator 300 moves to the touched position (step 620).

Even when the user is not touching touch-panel display 124 with touch pen 200, acceleration is detected and the ID is transmitted as long as the user holds touch pen 200. Therefore, image display apparatus receives the ID and maintains the display of indicator 300, and the above-described process is executed. When the user puts down touch pen 200 at a stationary position, though the ID is kept transmitted for a prescribed time period (T0), the transmission of ID is stopped after the lapse of the prescribed time period (T0) (step 422 of FIG. 5). Therefore, indicator 300 is erased (step 518 of FIG. 6).

The indicator once erased is displayed again when the ID is transmitted from touch pen 200. Here, the indicator may be re-displayed at a default position with default settings, as when the indicator was displayed for the first time after the activation of present program, or it may be displayed at a position immediately before erasure with the settings immediately before erasure. In order to re-display the indicator in a state immediately before the erasure, by way of example, the settings of touch pen should be stored in a prescribed area of RAM 106 when the indicator is about to be erased at step 518 of FIG. 6, and the indicator should be displayed using the settings stored in RAM 106 when it is re-displayed at step 506.

In this manner, when the user makes touch operations using touch pen 200, image display apparatus 100 can provide a user interface that is easily operable.

The programs shown in FIGS. 5 to 8 may be executed with various modifications.

Though an example has been described in which touch pen 200 has an acceleration sensor 212 and the ID is transmitted when acceleration is detected, it is not limiting. Any sensor may be used provided that it can detect that the user is holding the touch pen. By way of example, a capacitance sensor may be provided on a surface of touch pen, and the ID signal may be continuously transmitted while the user is touching the sensor.

Alternatively, a switch that can be operated by the user may be separately provided on a side or a rear end of the touch pen, and the ID signal may be transmitted while the switch is ON. The switch may be a momentary switch as in the case of switch 210, or it may be a switch that is locked in the ON or OFF state. If a momentary switch is used, it is preferred to arrange the switch at a position where the switch is naturally pressed while the user conducts touching operations holding the touch pen.

Though an example has been described above in which the ID is transmitted, it is not limiting. Any data that represents that the touch pen is about to be used may be transmitted.

The method of displaying the menu is not limited to the one shown in FIG. 10, in which the menu is displayed around the indicator. What is necessary is that the menu is displayed near the indicator, and the specific arrangement of each items of the menu (icons) may be determined as desired.

The items included in the menu are not limited to those shown in FIG. 10. Any item may be included provided that an instruction can be given to image display apparatus 100 by a touch operation with the touch pen. For example, an icon designating a file operation (such as file open, close, or save) to recording unit 108, or an icon designating printing of an image displayed on display unit 114 may be displayed.

Though an example has been described above in which the ID is kept transmitted for a prescribed time period T0 after the detection of acceleration of the touch pen is stopped, it is not limiting. The ID transmission may be stopped immediately when detection of acceleration of touch pen is stopped. In that case, when image display apparatus 100 fails to receive the ID, the indicator is erased immediately. Alternatively, image display apparatus 100 may maintain display of the indicator until a prescribed time passes, using timer 120, rather than immediately erasing the indicator.

Though an example has been described above in which the indicator information on RAM 106 is maintained when the indicator is erased at step 518, the indicator information on RAM 106 may be erased. In that case, it follows that when the indicator is displayed at step 506, it is always displayed at the default position with default settings.

Though an example has been described above in which the indicator is kept displayed while the menu is erased during drawing, it is not limiting. The indicator may also be erased during drawing.

Though an example has been described above in which the indicator is moved close to the position where the touch pen is lift up after drawing, it is not limiting. Even in a mode other than the drawing mode (such as the view mode), when the touch operation by the touch pen ends, the indicator may be moved to the position where the touch pen is lift up.

Though an example has been described in which the indicator is moved to the touched position if a long tap is done with the touch pen while the indicator is being displayed (the determination at step 618 of FIG. 8 is YES), the operation for moving indicator is not limited to the long tap. By way of example, when a double tap is done by the touch pen while the indicator is being displayed, the indicator may be moved to the touched position. If the indicator is moved at step 620 of FIG. 8 and then the touched position is changed while the touching is maintained, the indicator may be moved in accordance with the change in position.

Though an example has been described above in which any special operation is not allocated to the long tap on the displayed indicator (the time until pen-up is detected at step 542 of FIG. 7 is not accounted for), it is not limiting. If a long tap is done on the indicator and thereafter the touched position changes while the touch is maintained, the indicator may be moved in accordance with the change in position.

Second Embodiment

In the first embodiment, the screen image (user interface) of the image display apparatus changes in accordance with a state of one touch pen. In contrast, in the second embodiment, the screen image of image display apparatus changes in accordance with respective states of a plurality of touch pens.

The image display apparatus in accordance with the present embodiment has the same configuration as image display apparatus 100 in accordance with the first embodiment (FIGS. 1 and 2). Each of the plurality of touch pens in accordance with the present embodiment has the same configuration as touch pen 200 in accordance with the first embodiment (FIGS. 3 and 4). It is noted, however, that the IDs stored in respective ROMs of the touch pens are different from each other. In the following, description will be given with reference to FIGS. 1 to 4.

The program executed in each touch pen 200 is the same as that shown in FIG. 5. It is noted, however, that the ID read from ROM 204 at step 406 differs touch pen by touch pen. Further, when the switch-on information is transmitted at step 410, the ID and the switch-on information are transmitted as a pair. By way of example, the ID and the switch-on information are contained together in one packet.

Figure 13:
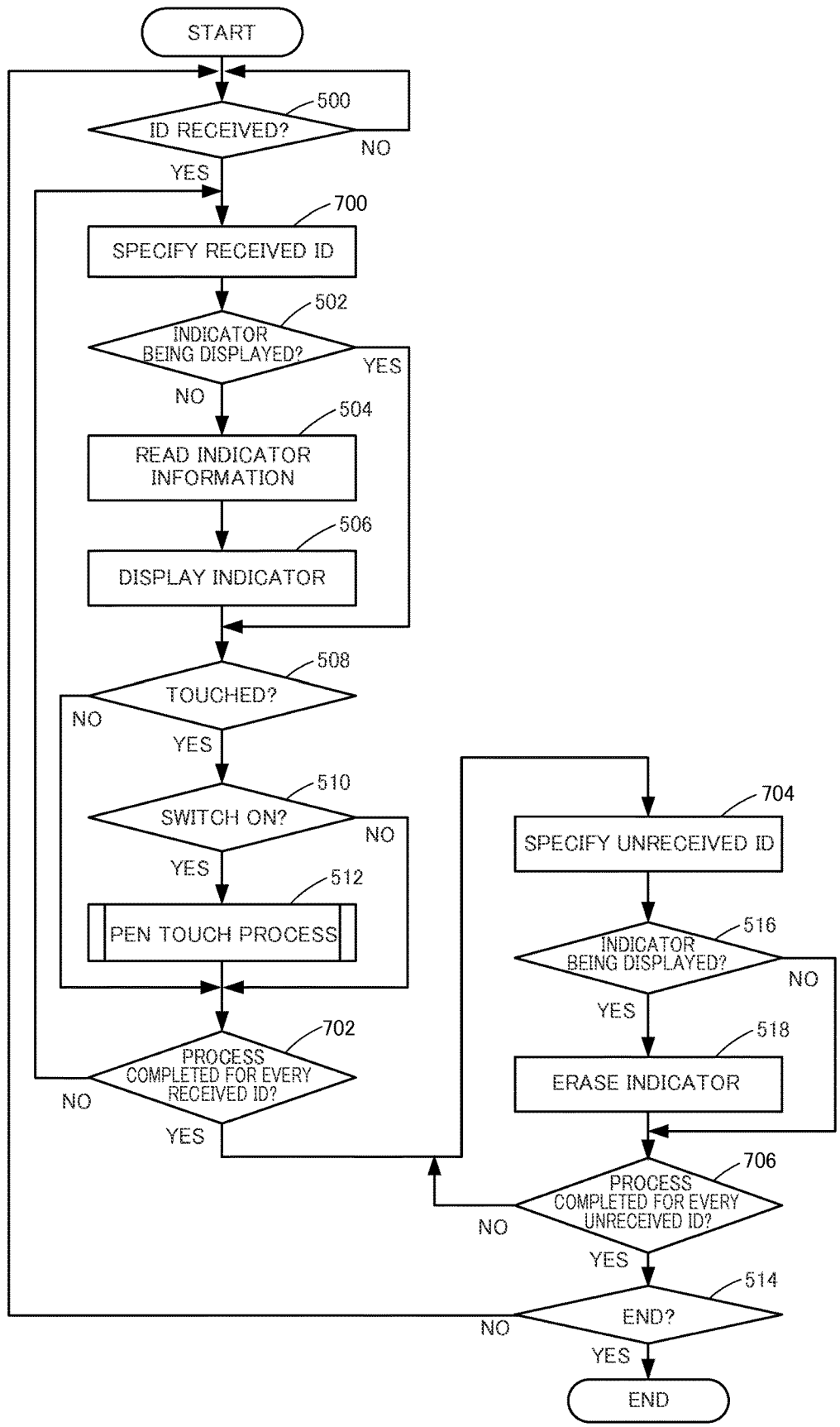
FIG. 13 is a flowchart representing a control structure of a program for realizing the user interface for the touch pen operation in the image display apparatus in accordance with a second embodiment of the present invention.

In the present embodiment, the program shown in FIG. 13 is executed in image display apparatus 100. Here, when touch pen 200 (FIG. 2) is to be used, information related to each touch pen 200 is registered in advance by a prescribed operation with the image display apparatus 100. By way of example, the ID of each touch pen 200 is stored in recording unit 108.

The flowchart of FIG. 13 differs from the flowchart of FIG. 6 in that steps 700 to 706 are newly added, and that steps 516 and 519 are positioned to be executed after step 704. In FIGS. 13 and 6, the processes of steps having the same reference characters are basically the same. In the following, description will be given with reference to FIGS. 7 and 8.

At step 500, CPU 102 determines whether or not an ID is received. CPU 102 stores the received ID in a prescribed area of RAM 106. Here, it is possible that a plurality of touch pens simultaneously transmit their IDs. Therefore, one or more IDs may be received. If it is determined that an ID or IDs are received, the control proceeds to step 700. Otherwise, step 500 is repeated.

At step 700, CPU 102 selects one of the received IDs. In the following, the selected ID will be denoted as IDi. For the selected IDi, steps 502 to 512 described with reference to the first embodiment are executed.

Figure 14:
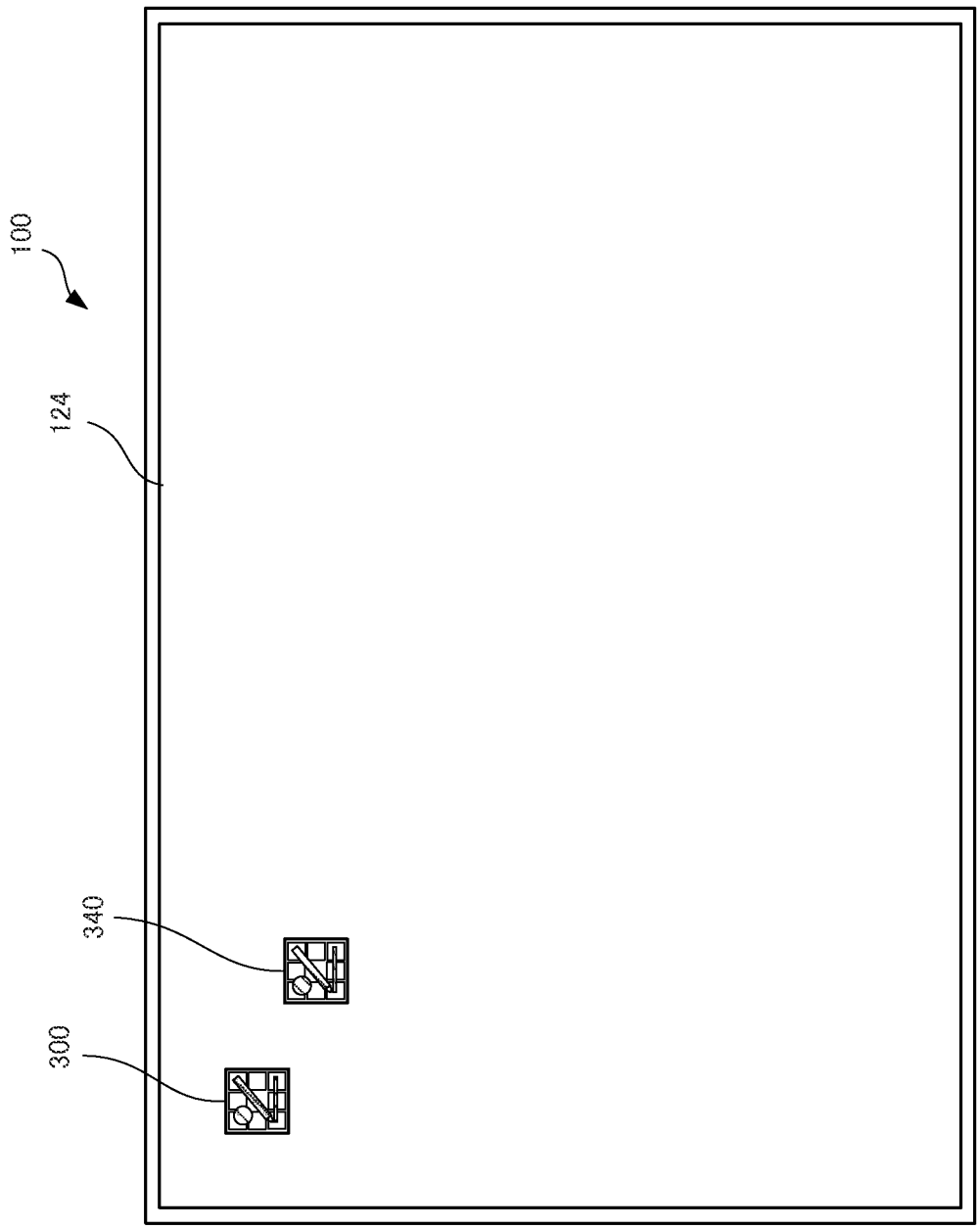
FIG. 14 shows the display screen of the image display apparatus on which a plurality of indicators corresponding to a plurality of pens are displayed.

When the indicator is displayed at step 506, if the indicator is displayed for the first time, it is displayed at a default position with default settings. If there is any other indicator that has been displayed, it is preferred to display the new indicator with the position of display changed so as not to overlap the existing indicator. For instance, if indicator 300 has already been displayed as shown in FIG. 14, a new indicator 340 is displayed not to overlap with indicator 300. It may be possible, however, to display the indicator on the same default position, since each indicator can be moved as desired, as will be described later.

In the pen touch process of step 512, each process step is executed with the object of processing being only the touch pen, the indicator and the menu corresponding to the selected IDi. Specifically, whether or not the area corresponding to the indicator or the menu corresponding to the selected IDi is touched with the touch pen corresponding to the selected IDi is determined. Assume that an indicator and a menu corresponding to an ID other than IDi are displayed, and the touch pen corresponding to the selected IDi touches the area of such an indicator or menu. In that case, at steps 540 and 548 of FIG. 7, the touch is determined to be a touch of an area other the indicator or the menu, and the pen drawing process of step 554 is executed.

Figure 15:
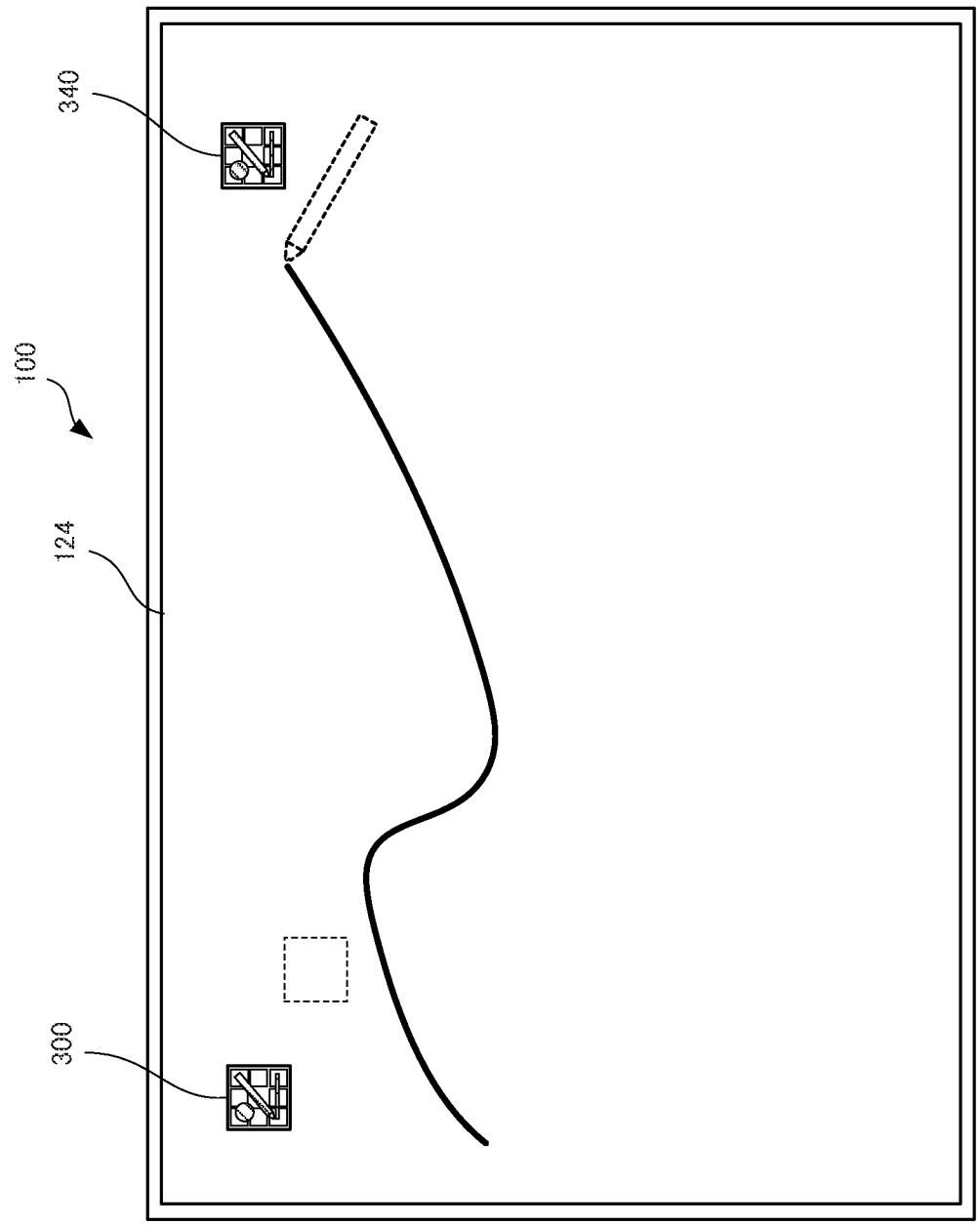
FIG. 15 shows the display screen of the image display apparatus when the touch pen is moved away from the touch-panel after drawing.

In the pen drawing process of step 544 (FIG. 8), again, the process steps are executed with the object being only the state (on/off of switch 210) of touch pen corresponding to the selected IDi. At steps 614 and 620 of FIG. 8, only the indicator of IDi is moved, and other indicators are not moved. For example, assume that two indicators 300 and 340 are displayed as shown in FIG. 14, and drawing is done with a touch pen having the ID corresponding to indicator 340 (step 610 of FIG. 8). Then, if the touch pen is moved away (pen-up), indicator 340 moves as shown in FIG. 15 (step 614). Indicator 300 corresponding to another touch pen is kept displayed at the same position as before.

At step 606, only the menu of indicator corresponding to the selected IDi may be erased. It is preferred, however, that the menus of all indicators displayed are erased, so as not to hinder the drawing operation.

At step 702, CPU 102 determines whether or not steps 502 to 512 are completed, for every ID received at step 500. If it is determined that the steps are completed, the control proceeds to step 704. Otherwise, the control returns to step 700, and CPU 102 selects one of the received IDs which is not accumulative. Then, steps 502 to 512 are executed.

At step 704, CPU 102 selects one ID, which has not been received at step 500, from among registered IDs (IDs stored in recording unit 108).

For the selected ID, steps 516 and 518 described with reference to the first embodiment above are executed.

When the indicator is to be erased at step 518, the indicator information on RAM 106 is not erased but maintained until the present program ends. Therefore, if an ID that corresponds to an indicator once erased is received at step 500, at step 506, the indicator is displayed using the indicator information corresponding to the received ID on the RAM 106 (the indicator information when the indicator was erased).

At step 706, CPU 102 determines whether or not steps 516 and 518 are completed for all IDs not received at step 500. If it is determined that the steps are completed, the control proceeds to step 514, and CPU 102 determines whether or not an end instruction is received. Depending on the result of determination, the program ends, or the control returns to step 500. Otherwise (if the steps are not completed), the control returns to step 704, and CPU 102 selects non-accumulating one ID that has not been received. Thereafter, steps 516 and 518 are executed.

In the above-described manner, even when a plurality of touch pens are used, image display apparatus 100 can provide an easily operable user interface to the users using respective touch pens, in the similar manner as in the first embodiment.

The program shown in FIG. 13 may be executed with various modifications.

Though an example has been described in which the ID of each touch pen is stored in recording unit 108, it is not limiting. In place of the ID, data uniquely corresponding to the ID may be stored. If the process is executed only on the received IDs, serial numbers may be allocated in the order of reception of the IDs. In that case, while the IDs are received, the indicator information that changes by the touch operation may be managed using the serial numbers allocated to the IDs.

Since the process is executed for each selected IDi one by one, only one timer 120 is necessary. While one touch pen touches touch-panel display 124 and another touch-pen touches touch-panel display 124, the operation of the touch pen that touched later is invalid. When the touch pen that touched earlier is moved away, the operation of the touch pen that touched later becomes valid.

If simultaneous touches by a plurality of touch pens are to be made valid, what is necessary is to provide a plurality of timers, to allocate one timer to each ID, and to execute processes corresponding to each ID in parallel as multitasks. Even when a plurality of touch pens are touching at one time, the timing of initial touch by each touch pen differs from each other and, therefore, based on the timing of switch-on of each touch pen and the timing when the positional information of touched position is obtained, the correspondence between the touch pen and the touched position can be determined. Thereafter, if the touch pens are kept touched and moved, a touched position with a small change in position is regarded as the touched position of one same touch pen (track), and in this manner, the correspondence between the touch pen and the touched position can be maintained.

Though an example has been described in which the touch pen transmits the switch-on information and the ID simultaneously, it is not limiting. While the user holds a touch pen in his/her hand and the ID of the touch pen is kept transmitted, the touch pen may execute transmission of the switch-on information and the transmission of the ID as separate processes. For example, the switch-on information and the ID may be transmitted in separate packets. Receiving the switch-on information transmitted when the switch is turned on, image display apparatus 100 associates the switch-on information with the ID that has been received immediately before. Thus, image display apparatus 100 can specify the touch pen (ID) that touched the touch-panel display, and can execute the corresponding process regarding the subsequent touch operation as the operation related to the specified ID.

Third Embodiment

In the first embodiment, the screen image (user interface) of the image display apparatus changes in accordance with the state of touch pen. In the third embodiment, the screen image of the image display also changes in accordance with the touch operation by one's finger, in addition to the state of touch pen.

The image display apparatus and the touch pen in accordance with the present embodiment have the same configurations as image display apparatus 100 (FIGS. 1 and 2) and touch pen 200 (FIGS. 3 and 4) in accordance with the first embodiment. In the following, description will be given with reference to FIGS. 1 to 4.

Figure 16:
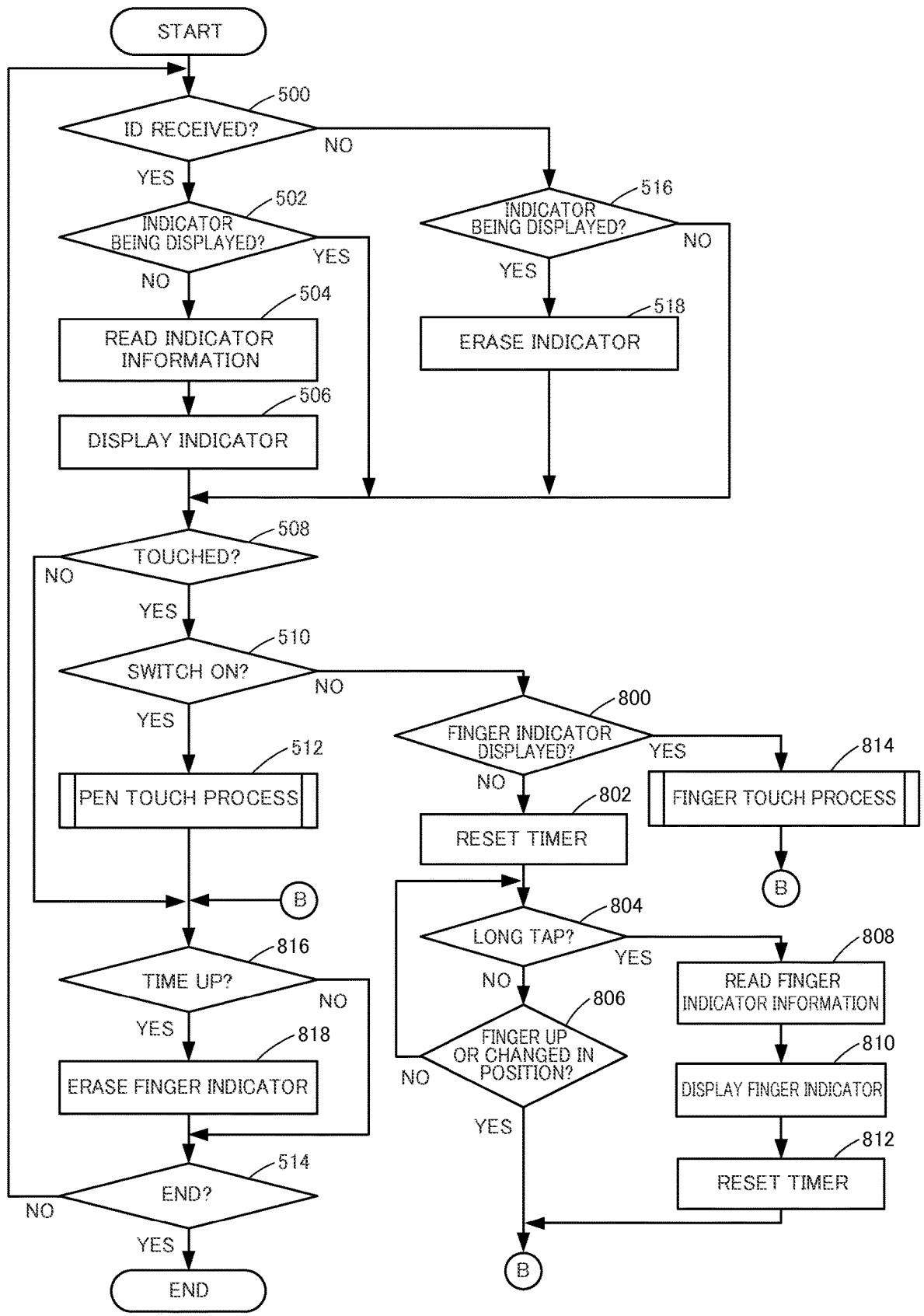
FIG. 16 is a flowchart representing a control structure of a program for realizing the user interface for the touch pen operation in the image display apparatus in accordance with a third embodiment of the present invention.
Figure 17:
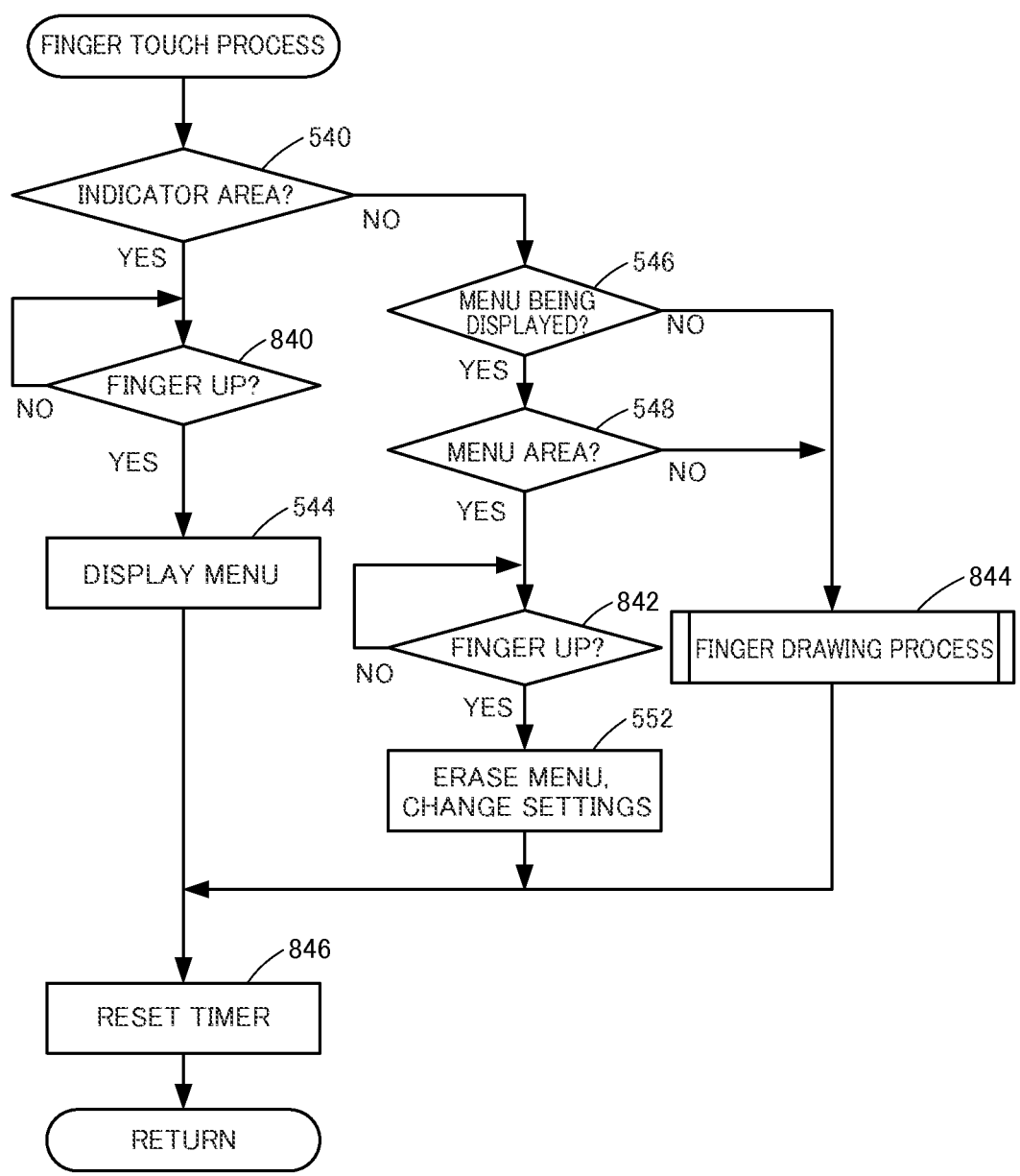
FIG. 17 is a flowchart representing a finger touch process in the flowchart of FIG. 16.
Figure 18:
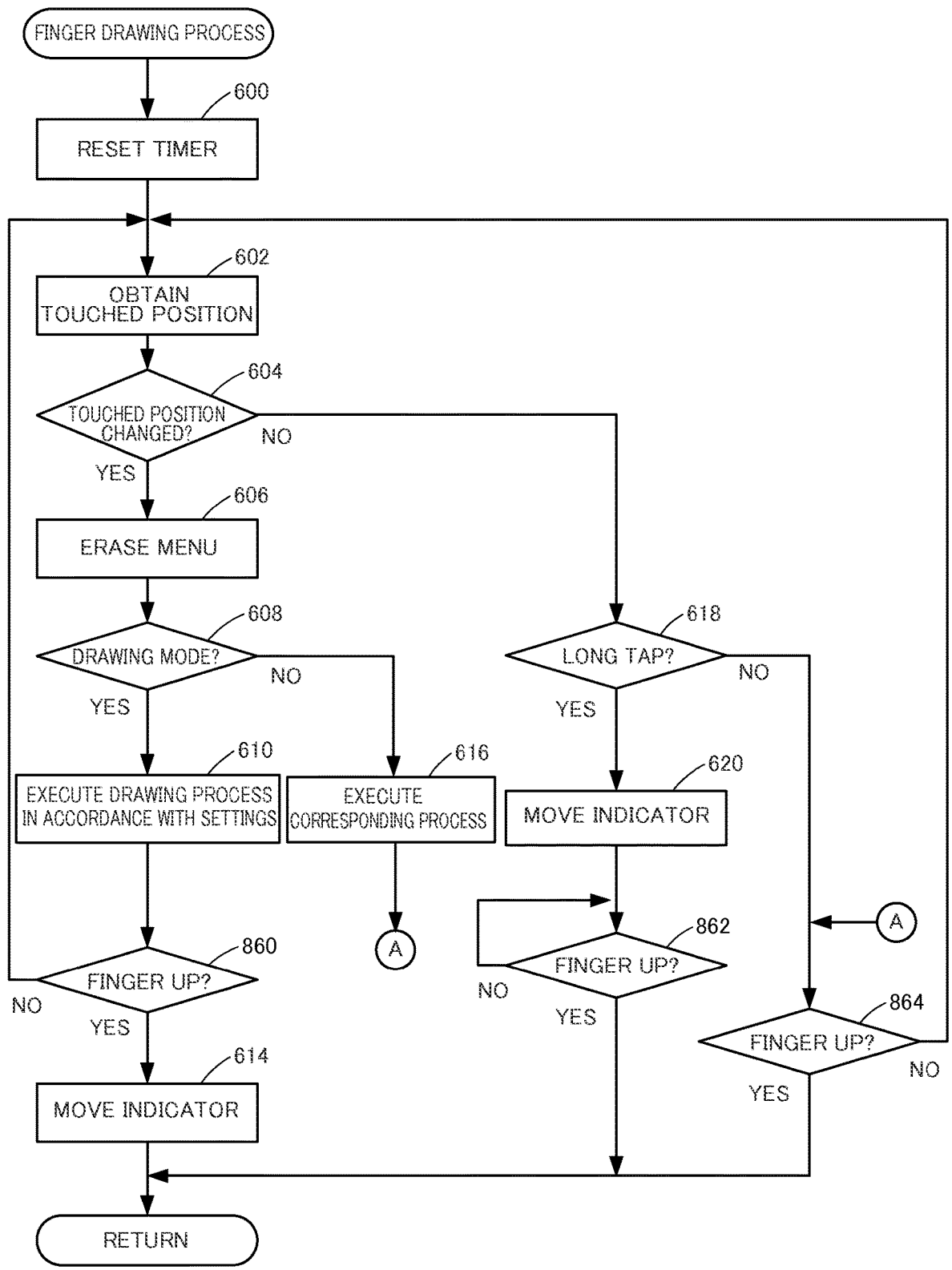
FIG. 18 is a flowchart representing a finger drawing process in the flowchart of FIG. 17.

In the present embodiment, the program executed by touch pen 200 is the same as that shown in FIG. 5. In image display apparatus 100, the program shown in FIGS. 16 to 18 is executed. FIGS. 16 to 18 correspond to FIGS. 6 to 8, respectively.

The flowchart of FIG. 16 differs from the flowchart of FIG. 6 only in that steps 800 to 818 are newly added. In FIGS. 16 and 6, the processes of steps having the same reference characters are basically the same.

When an ID of touch pen 200 is received at step 500 of FIG. 16, as in the first embodiment, process steps 502 to 506 are executed, and an indicator corresponding to the touch pen is displayed. If no ID is received at step 500, steps 516 and 518 are executed, and if an indicator corresponding to touch pen 200 has been displayed, the indicator is erased.

Assume that a touch to touch-panel display 124 is detected at step 508 and step 510 is executed, while the switch-on information of touch pen 200 is not received. In that case, at step 800, CPU 102 determines whether or not an indicator related to an operation by a finger (hereinafter also referred to as a finger indicator) is displayed. The display of finger indicator will be described later. If it is determined that a finger indicator is displayed, the control proceeds to step 814. Otherwise, the control proceeds to step 802.

At step 802, CPU 102 resets timer 120. This is to enable determination of a long tap by the finger, as will be described below.

At step 804, CPU 102 determines whether a prescribed time period has passed with the touched position unchanged (long tap). Specifically, CPU 102 obtains the current value of the timer (current time after it is reset at step 802) from timer 120, and determines whether or not the value is larger than a prescribed value T1 (whether or not the time period T1 has passed). If it is determined that the prescribed time period T1 has passed, the control proceeds to step 808. Otherwise, the control proceeds to step 806.

At step 806, CPU 102 determines whether detection of a touch is stopped, or whether the touched position has been changed. That the touch is no longer detected means the finger is moved away from touch-panel display 124. If it is determined that the finger is moved away or the touched position has been changed, the control proceeds to step 816. Otherwise (the finger is not moved away and the touched position is unchanged), the control returns to step 804.

At step 808, CPU 102 reads the default indicator information stored in recording unit 108 as at step 504, and stores the information in a prescribed area of RAM 106. At this time, if the indicator information corresponding to touch pen 200 has been stored in RAM 106, the read information is stored such that the indicator information is maintained. Since the indicator information of touch pen 200 and the indicator information of the finger (hereinafter also referred to as the finger indicator information) can be changed by a touch operation, these pieces of information are managed as separate pieces of information.

At step 810, CPU 102 displays the finger indicator on display unit 114, using the finger indicator information on RAM 106. By way of example, as shown in FIG. 19, a finger indicator 352 is displayed at the position long-tapped by a finger 350.

At step 812, CPU 102 resets timer 120. This is a process for setting a reference to determine timing for erasing finger indicator 352, as will be described later. Thereafter, the control proceeds to step 816.

In this manner, in response to a long tap by a finger, through the steps 802 to 810, finger indicator 352 is displayed.

When finger indicator 352 is being displayed, at step 814, CPU 102 executes a process in accordance with the touch operation by the finger (such as menu display, menu erasure or drawing process). The process at step 814 (finger touch process) is specifically shown in FIG. 17. The flowchart of FIG. 17 differs from that of FIG. 7 in that steps 542, 550 and 554 of FIG. 7 are replaced by steps 840, 842 and 844, respectively, and that a step 846 is newly added. In FIGS. 17 and 7, the processes of steps having the same reference characters are basically the same.

In the finger touch process of step 814, each process step is executed with the object of processing being only the indicator (finger indicator) and the menu, corresponding to the finger. Specifically, whether or not the area corresponding to the finger indicator or the menu is touched by the finger is determined. For example, assume that an indicator and a menu corresponding to the touch pen are displayed and it is detected that the corresponding area is touched while the switch-on signal of the touch pen is not received. In this situation, at steps 540 and 548 of FIG. 17, the touch is determined to be a touch outside the areas of finger indicator and the menu therearound and, hence, the finger drawing process of step 844 is executed. The finger touch process at step 814 is executed only when the result of determination at step 510 is NO, that is, only when the switch of touch pen 200 is off.

At steps 840 and 842, CPU 102 determines whether or not detection of a touch is stopped. That the touch is no longer detected means the finger is moved away from touch-panel display 124 (touch detecting unit 112).

At step 844, CPU 102 executes the finger drawing process. The process of step 844 (finger drawing process) is specifically shown in FIG. 18. The flowchart of FIG. 18 differs from that of FIG. 8 only in that steps 612, 622 and 624 of FIG. 8 are replaced by steps 860, 862 and 864, respectively. In FIGS. 18 and 8, the processes of steps having the same reference characters are basically the same.

In the finger drawing process at step 844, each process step (drawing process, detection of long tap, and moving the indicator) is executed with the object of processing being only the finger-touched state. For example, at steps 614 and 620, only the finger indicator is moved and even when an indicator of a touch pen is displayed, it is not moved. By way of example, assume that while two indicators 300 and 352 are displayed, one draws with a finger (step 610 of FIG. 18) and then moves his/her finger away. Then, only the finger indicator 352 moves as shown in FIG. 20 (step 614 of FIG. 18). The indicator 300, which corresponds to touch pen 200, is kept displayed at the same position.

At step 606, only the menu of finger indicator may be erased. It is preferred, however, that the menus of all indicators displayed are erased, so as not to hinder the drawing operation.

At steps 860 to 864, CPU 102 detects that the finger is moved away (finger-up) from the touch-panel display 124, as at step 840.

Returning to FIG. 17, at step 846, CPU 102 resets timer 120. Step 846 is the process for setting a reference to determine timing for erasing finger indicator, as at step 812. Thereafter, the control proceeds to step 816 of FIG. 16.

At step 816, CPU 102 determines whether a prescribed time period has passed from when the finger touch operation is stopped while the finger indicator is kept displayed. Specifically, CPU 102 obtains the current value of the timer (current time after it is reset at step 812 or 846) from the timer 120, and determines whether or not the value is larger than a prescribed value T3 (whether or not the time period T3 has passed). If it is determined that the prescribed time period T3 has passed, the control proceeds to step 818. Otherwise, the control proceeds to step 514.

At step 818, CPU 102 erases the finger indicator. At this time, the finger indicator information on RAM 106 is not erased but maintained.

As described above, image display apparatus 100 can provide an interface allowing easy operation as in the first embodiment, not only when a touch pen is used but also when touch operations is made by a finger. Specifically, it is possible to detect a long tap by a finger and to display the finger indicator (steps 804 to 810 of FIG. 16). If a touch operation by a finger is detected while the finger indicator is being displayed, the menu is displayed (step 544 of FIG. 17), the indicator information is changed (step 552 of FIG. 17), or the drawing process is executed (step 844 of FIG. 17), in accordance with the touched position. When the drawing process ends and the finger is up, the finger indicator moves to the position where the finger has been lift up (step 614 of FIG. 18). Further, in response to a long tap by the finger while the finger indicator is being displayed, the finger indicator is moved to the long-tapped position (step 620 of FIG. 18).

The program shown in FIGS. 16 to 18 may be executed with various modifications.

Though an example has been described in which the finger indicator is displayed when long tap is done by a finger, the operation to cause display of the finger indicator is not limited to a long tap. By way of example, the finger indicator may be displayed in response to a double tap by a finger.

Though an example has been described in which the finger indicator is displayed in response to a touch by a finger, the touch may not be by the finger. If image display apparatus 100 is long tapped by anything other than the touch pen of which ID can be received, the corresponding indicator is displayed. Therefore, if a touch pen of which ID cannot be received by image display apparatus 100, or a touch pen that does not transmit its ID is used, the corresponding indicator is displayed in response to a long tap by the pen, in the similar manner as when a finger is used.

Though an example has been described above in which one touch pen transmitting its ID and the finger are used and respective indicators are displayed, it is not limiting. In the second embodiment in which a plurality of touch pens are used, the finger indicator may be displayed in response to a touch by a finger.

Image display apparatus 100 is not limited to a display apparatus having a large screen. The present invention may be generally applicable to any display apparatus that allows drawing and screen operations by a touch, such as a tablet type terminal device.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image display apparatus, comprising:
   a display unit configured to display an image;
   a touch detecting unit configured to detect a touch operation, superposed on said display unit; and
   a control unit configured to execute a process allocated to the touch operation detected by said touch detecting unit;
   wherein:
   in response to said touch detecting unit detecting a first touch operation on an indicator icon displayed on a drawing area of said display unit, said display unit is configured to display a plurality of menu icons representing drawing parameters near and surrounding said indicator icon, the drawing area being an area in which a line can be drawn by a second touch operation of a user,
   in response to said touch detecting unit detecting a third touch operation on any of said plurality of menu icons, said display unit is configured to change the image of said indicator icon in accordance with the menu icon having been touched,
   in response to said touch detecting unit detecting a start of a drawing operation, said display unit is configured to erase said plurality of menu icons and thereby resume a state in which said indicator icon alone is displayed,
   the indicator icon includes a figure displayed in a set color in which the drawing operation draws provided that the drawing operation is performed on the drawing area, and
   the plurality of menu icons displayable in response to a touch on the indicator icon that includes the figure displayed in the set color includes a plurality of colors selectable as the set color;
   said image display apparatus further comprising:
   a plurality of touch pens each configured to automatically detect a state of itself being held and to transmit an ID identifying itself before a drawing operation is done by the user;
   a receiving unit configured to receive said ID transmitted from each of said plurality of touch pens; and
   a storage unit storing information related to each of said plurality of touch pens;
   said display unit
   displays, in response to said receiving unit receiving said ID, said indicator icon corresponding to said received ID with reference to said information stored in said storage unit, and resumes, in response to start of said drawing operation by one touch pen of said plurality of touch pens, a state in which said indicator icon corresponding to said one touch pen alone is displayed, wherein in response to detection of a long tap by said touch pen, said display unit moves the indicator icon corresponding to the long-tapped touch pen to the long-tapped position.

2. The image display apparatus according to claim 1, wherein in response to said touch detecting unit detecting an end of said drawing operation, said display unit is configured to change position of display of said indicator icon without any drag operation by the user.

3. The image display apparatus according to claim 1, wherein the image of said indicator icon is changed to include a new and different indicator icon in response to said touch detecting unit detecting the third touch operation.

4. The image display apparatus according to claim 1, wherein said display unit is configured to display respective ones of the plurality of menu icons representing the drawing around top, bottom, left, and right edges of said indicator icon, in response to said touch detecting unit detecting the first touch operation.

5. The image display apparatus according to claim 1, wherein the plurality of menu icons displayable in response to a touch on the indicator icon that includes the set color includes a plurality of color selection menu icons, each corresponding to a different one of the plurality of colors from which a color is selectable as the set color.

6. The image display apparatus according to claim 5, wherein the plurality of color selection menu icons, when displayed, are provided along a vector at least partially surrounding the indicator icon.

7. The image display apparatus according to claim 1, wherein the plurality of menu icons, when displayed, are provided in a grid-like formation near and surrounding said indicator icon.

8. The image display apparatus according to claim 7, wherein the plurality of menu icons displayable in response to a touch on the indicator icon that includes the set color includes a plurality of color selection menu icons, each corresponding to a different one of the plurality of colors from which a color is selectable as the set color.

9. The image display apparatus according to claim 7, wherein the menu icons, when displayed, are rectangular.

10. A method of operating an image display apparatus comprising a plurality of touch pens each configured to automatically detect a state of itself being held and to transmit an ID identifying itself before a drawing operation is done by a user, the method comprising:
in response to detection of a first touch operation on an indicator icon, displaying a plurality of menu icons representing drawing parameters near and surrounding said indicator icon, the indicator icon being displayed in a drawing area in which a line can be drawn in response to a second touch operation of the user, and
in response to detection of a start of a drawing operation, erasing said plurality of menu icons and thereby resuming a state in which said indicator icon alone is displayed,
wherein the indicator icon includes a figure displayed in a set color in which the drawing operation draws provided that the drawing operation is performed on the drawing area, and
wherein the plurality of menu icons displayable in response to a touch on the indicator icon that includes the figure displayed in the set color includes a plurality of colors selectable as the set color, the method further comprising:
having stored information related to each of said plurality of touch pens;
displaying, in response to one of said IDs being received, said indicator icon corresponding to said received ID with reference to said information stored, and
resuming, in response to start of said drawing operation by one touch pen of said plurality of touch pens, a state in which said indicator icon corresponding to said one touch pen alone is displayed, wherein in response to detection of a long tap by said touch pen, the indicator icon corresponding to the long-tapped touch pen is moved to the long-tapped position.

11. An image display apparatus, comprising:
a touch screen display configured to display an image and detect touch operations; and
at least one processor operatively coupled to the touch screen display configured to at least:
in response to detection of a first touch operation on an indicator icon displayed on a drawing area of said touch screen display, cause the touch screen display to display a plurality of menu icons representing drawing parameters near and surrounding said indicator icon, the drawing area being an area in which a line can be drawn by a second touch operation of a user,
in response to detection of a third touch operation on any one of said plurality of menu icons, cause a change to the image of said indicator icon in accordance with the menu icon having been touched, and
in response to detection of a start of a drawing operation, cause said plurality of menu icons to be erased and resumption of a state in which said indicator icon alone is displayed,
wherein the indicator icon includes a figure displayed in a set color in which the drawing operation draws provided that the drawing operation is performed on the drawing area,
wherein the plurality of menu icons displayable in response to a touch on the indicator icon that includes the figure displayed in the set color includes a plurality of colors selectable as the set color,
wherein the image display apparatus further comprises:
a plurality of touch pens each configured to automatically detect a state of itself being held and to transmit an ID identifying itself before a drawing operation is done by the user, and
storage storing information related to each of said plurality of touch pens, and
wherein the at least one processor is further configured to at least:
receive said ID transmitted from each of said plurality of touch pens;
in response to said ID being received, cause said indicator icon corresponding to said received ID to be displayed with reference to said information stored in said storage, and
in response to start of said drawing operation by one touch pen of said plurality of touch pens, resume a state in which said indicator icon corresponding to said one touch pen alone is displayed, wherein in response to detection of a long tap by said touch pen, the indicator icon corresponding to the long-tapped touch pen is moved to the long-tapped position.

12. The image display apparatus according to claim 11, wherein in response to detection of an end of said drawing operation, a position in which the indicator icon is displayed is changed without any drag operation being performed by the user.

13. The image display apparatus according to claim 11, wherein the image of said indicator icon is changed to include a new and different indicator icon in response to the detection of the third touch operation.

14. The image display apparatus according to claim 11, wherein responsive to detection of the third touch operation, respective ones of the plurality of menu icons representing the drawing are displayed around top, bottom, left, and right edges of said indicator icon.

15. An image display apparatus, comprising:
a display unit configured to display an image;
a touch detecting unit configured to detect a touch operation, superposed on said display unit; and
a control unit configured to execute a process allocated to the touch operation detected by said touch detecting unit; wherein:
in response to said touch detecting unit detecting a first touch operation on an indicator icon displayed on a drawing area of said display unit, said display unit is configured to display a plurality of rectangular menu icons representing drawing parameters in a grid-like formation near and surrounding said indicator icon, the drawing area being an area in which a line can be drawn by a second touch operation of a user,
in response to said touch detecting unit detecting a third touch operation on any of said plurality of menu icons, said display unit is configured to change the image of said indicator icon in accordance with the menu icon having been touched, and in response to said touch detecting unit detecting a start of a drawing operation, said display unit is configured to erase said plurality of menu icons and thereby resume a state in which said indicator icon alone is displayed,
the indicator icon includes a figure displayed in a set color in which the drawing operation draws provided that the drawing operation is performed on the drawing area, and
the plurality of menu icons displayable in response to a touch on the indicator icon that includes the figure displayed in the set color includes a plurality of colors selectable as the set color;
said image display apparatus further comprising:
a plurality of touch pens each configured to automatically detect a state of itself being held and to transmit an ID identifying itself before a drawing operation is done by the user;
a receiving unit configured to receive said ID transmitted from each of said plurality of touch pens; and
a storage unit configured to store information related to each of said plurality of touch pens;
said display unit being further configured to:
display, in response to said receiving unit receiving said ID, said indicator icon corresponding to said received ID with reference to said information stored in said storage unit, and
resume, in response to start of said drawing operation by one touch pen of said plurality of touch pens, a state in which said indicator icon corresponding to said one touch pen alone is displayed, wherein in response to detection of a long tap by said touch pen, said display unit moves the indicator icon corresponding to the long-tapped touch pen to the long-tapped position.

* * * * *